US008514842B1

(12) United States Patent
Jared et al.

(10) Patent No.: US 8,514,842 B1
(45) Date of Patent: Aug. 20, 2013

(54) SYSTEMS AND METHODS FOR ENABLING COMMUNICATION BETWEEN USERS OF COMMON VIRTUAL SPACES

(75) Inventors: David Jared, Denver, CO (US); Renaun Erickson, Las Vegas, NV (US); Danielle Deibler, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1226 days.

(21) Appl. No.: 12/038,656

(22) Filed: Feb. 27, 2008

Related U.S. Application Data

(60) Provisional application No. 60/976,293, filed on Sep. 28, 2007.

(51) Int. Cl.
  *G06F 15/16* (2006.01)
(52) U.S. Cl.
  USPC .......................................... 370/352; 709/248
(58) Field of Classification Search
  USPC ................. 709/204, 205, 248, 207; 345/419, 345/173; 370/254, 336, 352; 726/11; 455/420; 715/764; 707/102
  See application file for complete search history.

(56) References Cited

U.S. PATENT DOCUMENTS

| 6,353,448 | B1 | 3/2002 | Scarborough et al. |
| 6,646,673 | B2 | 11/2003 | Caviedes et al. |
| 6,789,120 | B1 | 9/2004 | Lee et al. |
| 6,985,478 | B2 | 1/2006 | Pogossiants et al. |
| 7,003,463 | B1 | 2/2006 | Maes et al. |
| 7,065,070 | B1 | 6/2006 | Chang |
| 7,095,733 | B1 | 8/2006 | Yarlagadda et al. |
| 7,471,644 | B2 * | 12/2008 | Sakai .......................... 370/254 |
| 7,512,656 | B2 * | 3/2009 | Tsuchiya .................... 709/205 |
| 8,031,631 | B2 * | 10/2011 | Sakai .......................... 370/254 |
| 2002/0143877 | A1 | 10/2002 | Hackbarth et al. |

(Continued)

FOREIGN PATENT DOCUMENTS

| EP | 696018 A2 * | 2/1996 |
| EP | 1498164 A2 * | 1/2005 |

OTHER PUBLICATIONS

Contact At Once!, webpage; archived Jun. 16, 2006; retrieved Oct. 28, 2010, 3 pages.

(Continued)

*Primary Examiner* — Asad Nawaz
*Assistant Examiner* — Parth Patel
(74) *Attorney, Agent, or Firm* — Kilpatrick Townsend & Stockton LLP

(57) ABSTRACT

Systems and methods are provided for enabling voice communication between users of common virtual spaces. A communication manager autonomously identifies a plurality of clients who are accessing a common virtual space, and autonomously initiates voice communication between the plurality of clients. The common virtual space may encompass any number of software applications (which may reside locally on client computers and/or which may be network-accessed applications) and which may be applications that are not communication centric. The communication manager comprises peer group identifying logic that is operable to identify a plurality of users who are accessing a common virtual space. The communication manager further comprises connection management logic that is operable to autonomously initiate voice communication between the peer group members. A light-weight communication module may be implemented on each client, which provides logic for enabling voice communication between the clients who are determined as being members of a peer group.

19 Claims, 10 Drawing Sheets

(56) References Cited

U.S. PATENT DOCUMENTS

| | | | |
|---|---|---|---|
| 2003/0097661 A1 | 5/2003 | Li et al. | |
| 2003/0233650 A1 | 12/2003 | Zaner et al. | |
| 2004/0032400 A1* | 2/2004 | Freeman et al. | 345/173 |
| 2005/0166154 A1 | 7/2005 | Wilson et al. | |
| 2006/0036959 A1* | 2/2006 | Heatherly et al. | 715/764 |
| 2006/0041686 A1* | 2/2006 | Caspi et al. | 709/248 |
| 2006/0193295 A1* | 8/2006 | White et al. | 370/336 |
| 2006/0242581 A1 | 10/2006 | Manion et al. | |
| 2006/0265508 A1 | 11/2006 | Angel et al. | |
| 2007/0004393 A1* | 1/2007 | Forsberg et al. | 455/420 |
| 2007/0115940 A1* | 5/2007 | Kamen et al. | 370/352 |
| 2007/0162487 A1* | 7/2007 | Frailey | 707/102 |
| 2007/0208806 A1* | 9/2007 | Mordecai et al. | 709/204 |
| 2008/0040441 A1 | 2/2008 | Maes | |
| 2008/0055306 A1* | 3/2008 | Kwok et al. | 345/419 |
| 2008/0134063 A1 | 6/2008 | Volach | |
| 2008/0144603 A1 | 6/2008 | Chouksey | |
| 2008/0144604 A1 | 6/2008 | Sharma | |
| 2008/0313550 A1 | 12/2008 | Shiga et al. | |
| 2009/0019367 A1 | 1/2009 | Cavagnari et al. | |
| 2009/0030999 A1* | 1/2009 | Gatzke et al. | 709/207 |
| 2009/0113389 A1 | 4/2009 | Ergo et al. | |
| 2009/0300520 A1 | 12/2009 | Ashutosh et al. | |
| 2010/0094859 A1 | 4/2010 | Gupta | |
| 2010/0122212 A1 | 5/2010 | Boudalier | |
| 2010/0122334 A1* | 5/2010 | Stanzione et al. | 726/11 |
| 2010/0192072 A1 | 7/2010 | Spataro et al. | |
| 2010/0235761 A1 | 9/2010 | Blagsvedt et al. | |
| 2011/0016408 A1 | 1/2011 | Grosz et al. | |
| 2011/0072355 A1 | 3/2011 | Carter et al. | |

OTHER PUBLICATIONS

FierceVoIP, Can VoIP save social networking?; Oct. 19, 2006; retrieved Oct. 27, 2010, 2 pages.
MozIAX; moziax.mozdev.org; archived Oct. 5, 2006; retrieved Oct. 26, 2010, 2 pages.
Uyless Black; Voice Over IP; Publisher: Prentice Hall, Aug. 4, 1999, 328 Pages, excerpt 11 pages.
Arrington, Michael, Ether pay-per-call launches for public use; Jun. 22, 2006; retrieved Oct. 27, 2010, 3 pages.
FIERCEVOIP.COM; Jaxtr social network VoIP tool bows: Do you care?; Dec. 14, 2006, 2 pages.
Gonzalez, Nick, Wengo Video Chat for Bloggers; Dec. 21, 2006; retrieved Oct. 27, 2010, 3 pages.
Keating, Tom, Wengo releases Flash VoIP client; Dec. 18, 2006; retrieved Oct. 27, 2010, 6 pages.
Luca Filigheddu, Firefox VoIP: Abbeynet;, Jun. 6, 2006; retrieved Oct. 27, 2010 , 14 pages.
Malik, Om, Flash in the VoIP Pan; Sep. 22, 2006; retrieved Oct. 27, 2010, 8 pages.
Veer, Vander E., Flash 8: The Missing Manual; Publisher: O'Reilly Media, Inc., Mar. 22, 2006, 464 Pages, excerpt 6 pages.
Wengo Visio, translated blog post, retrieved Oct. 27, 2010, Dec. 11, 2006, 9 pages http://www.genbeta.com/web/wengo-vision-videoconferencias-para-tu-web-mediante-unwidget.
Notice of Allowance dated Dec. 9, 2010 in U.S. Appl. No. 11/611,019.
Advisory Action dated Jan. 27, 2011 in U.S. Appl. No. 11/611,046.
Office Action dated Nov. 15, 2010 in U.S. Appl. No. 11/611,046.
Macromedia FLASH Media Server 2 Client-Side ActionScript Language Reference for Flash Media Server 2 (available at http:download.macromedia.com/pub/documentation/en/flashmediaserver/2/flashmediaserver_cs_asd.pdf) (last accessed Dec. 14, 2006).
Macromedia FLASH Media Server 2 Server-Side ActionScript Language Reference, (available at http://download.macromedla.com/pub/documentation/en/flashmediaserver/2/flashmediaserver_ss_asd.pdf) (last accessed Dec. 14, 2006).
Macromedia Breeze, Breeze Integration Guide, (available at http://download.macromedia.corn/pub/documentation/en/breeze/5/brze5_integration.pdf (last accessed Dec. 14, 2006).
Macromedia Breeze, Breeze Meeting User Guide for Meeting Hosts and Presenters, (available at http://download.macromedia.com/pub/documentation/en/breeze/5/meeting_ug_presenters.pdf) (last accessed Dec. 14, 2006).
U.S. Appl. No. 11/611,019, filed Dec. 14, 2006.
U.S. Appl. No. 11/611,046, filed Dec. 14, 2006.
U.S. Appl. No. 12/239,672, filed Sep. 26, 2008.
Conaito VoIP Standard SDK, http://web.archive.org/web/20061125011713/www.conaito.com/voip_standard_ueber_blick.asp, archived Nov. 25, 2006 and retrieved May 17, 2010.
CounterPath. eyeBeam 1.11 User Guide, http://web.archive.org/web/20051215115317/www.counterpath.com/docs/eyeBeam1.11UserGuide.pdf, archived Dec. 15, 2005 and retrieved May 14, 2010.
Definition of SDK, http ://searchcio-midmarket.techtarget.com/sDefinition/0,,sid183_gci213603,00.html, updated Sep. 27, 2005 retrieved May 17, 2010.
EyeBeam Software Development Kit (SDK) http://web.archive.org/web/20051217093310/www.counterpath.com/index.php?menu=eyeBeamSDK, archived Dec. 17, 2005 linked to eyeBeam SDK Product Specification, http://web.archive.org/web/20051205013738/www.counterpath.com/docs/eyebeam.pdf, archived Dec. 5, 2005, both retrieved May 14, 2010.
Office Action dated Apr. 5, 2010 in U.S. Appl. No. 11/611,019.
Office Action dated Jul. 23, 2010 in U.S. Appl. No. 11/611,019.
Office Action dated May 21, 2010 in U.S. Appl. No. 11/611,046.
Final Office Action in related U.S. Appl. No. 12/239,672 dated Apr. 19, 2012.
Final Office Action in related U.S. Appl. No. 12/239,672 dated Jan. 5, 2012, 20 pages.
Non Final Office Action from Related U.S. Appl. No. 11/611,046 dated Nov. 23, 2012, 25 pages.
Office Action dated Sep. 29, 2009 in U.S. Appl. No. 11/611,019.

* cited by examiner

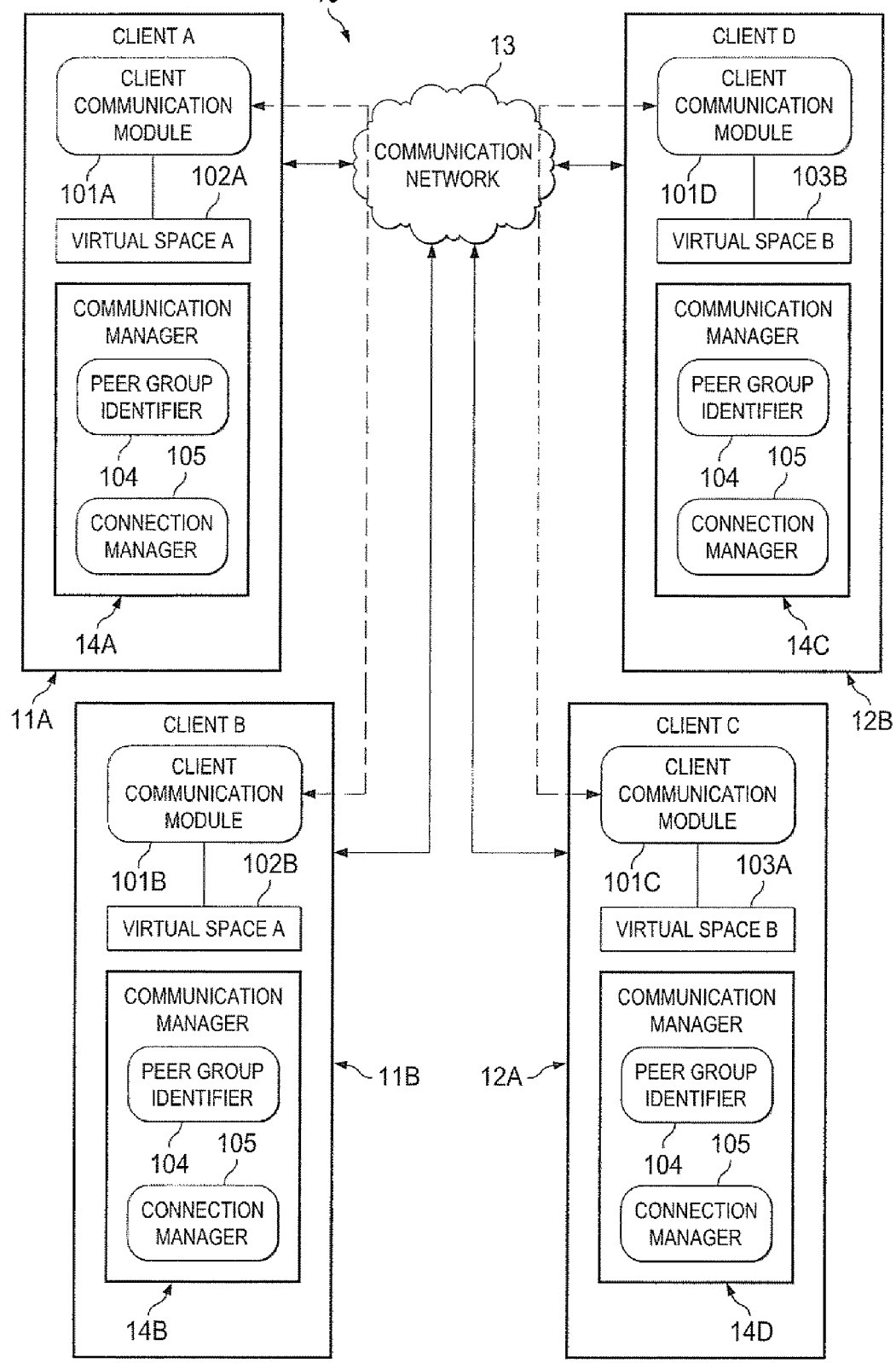

SYSTEMS AND METHODS FOR ENABLING COMMUNICATION BETWEEN USERS OF COMMON VIRTUAL SPACES

CROSS-REFERENCE TO RELATED APPLICATIONS

This application claims priority to U.S. Provisional Patent Application Ser. No. 60/976,293 titled "SYSTEMS AND METHODS FOR AN ENHANCED SHARED EXPERIENCE" filed Sep. 28, 2007, the full disclosure of which is hereby incorporated herein by reference. This application is also related to co-pending and commonly assigned U.S. patent application Ser. No. 11/611,046 titled "INTERFACE-NEUTRAL COMMUNICATION ARCHITECTURE" filed Dec. 14, 2006, and co-pending and commonly assigned U.S. patent application Ser. No. 11/611,019 titled "REAL-TIME COMMUNICATION USING INTER-PROCESS COMMUNICATIONS" filed Dec. 14, 2006 the disclosures of which are hereby incorporated herein by reference.

TECHNICAL FIELD

The following description relates generally to systems and methods for enabling users to communicate with each other, and more specifically to systems and methods for identifying users who are accessing a common virtual space (e.g., a common website, desktop application, etc.) and autonomously enabling those users to communicate (e.g., via voice communication) with each other.

BACKGROUND

Traditionally, persons working on a common project may share a physical location (e.g., cubicle environment, conference room, etc.) in which the persons can easily communicate face-to-face with each other. In such a traditional environment, the persons are generally capable of communicating with each other by the mere fact that they are in a common physical location. For instance, persons who are in a common conference room can easily talk with each other.

Today, users often conduct activities in virtual spaces. For instance, many activities are conducted using computer-executable programs (or "applications"), websites, etc. As an example, software developers commonly use computer-executable software development applications, such as DREAMWEAVER®, available from Adobe Systems Incorporated, and FRONTPAGE®, available from Microsoft Corporation, to develop code for software programs. Similarly, users often use presentation software, such as Microsoft's POWERPOINT®, to generate presentations, users often use animation-editing software, such as Adobe Systems Incorporated's FLASH® and AFTER EFFECTS® authoring tools, to create and/or edit animation (e.g., videos, etc.), and users often use image-editing software, such as Adobe Systems Incorporated's PHOTOSHOP®, to create and/or edit images. These and/or other activities may be conducted via desktop applications executing on a user's device (e.g., personal computer (PC), workstation, or a mobile computing device, such as a laptop, personal digital assistant (PDA), mobile telephone, etc.) or they may be conducted via accessing a server device over a communication network. For instance, many activities are conducted today through use of a browser on a user's device accessing, via the Internet, a website (hosted by a web server). As examples, such activities as developing software, participating in an on-line auction (e.g., www.ebay.com), purchasing airline tickets, performing banking, stock trading, and/or other financial transactions, sharing information with family members (www.myfamily.com), et cetera can be performed via the web. As can be seen, not only are work-related activities often conducted in a virtual space, but entertainment activities (e.g., gaming activities, etc.), personal interest activities (e.g., hobbies, etc.), et cetera may be conducted in a virtual space (e.g., using a desktop application, website, or other type of computer-executable software application that provides functionality for performing the desired activities).

Further, the various users who work in a particular virtual space may be geographically distributed. For instance, computer programmers who work on coding a particular software program may be geographically distributed. The programmers may all use a common software development application, and they may often be desirous of communicating with each other (e.g., to exchange ideas, ask questions, exchange portions of the code that they have each authored, etc.). Thus, in many instances users who are accessing common virtual spaces (e.g., accessing a common desktop application, such as software code development application, accessing a common website or portion of a website, etc.) may thus be desirous of communicating with each other.

Recently Voice Over Internet Protocol (VoIP) phone service has become popular with consumers, with more people and businesses choosing to migrate to it and away from traditional Plain Old Telephone Service (POTS) every year. VoIP service is a telephone service that uses the Internet to make telephone calls, usually for a fixed fee and a very low per-minute charge, even for some international calls. VoIP systems can be either hardware-based, with special telephone sets or adapters for regular phones in communication with a network router, or software-based, thereby allowing a user to employ a personal computer as a telephone.

Software-based VoIP phones are sometimes referred to as "softphones," and they vary from service to service. Attention has recently been focused on providing softphone functionality in web browser plug-ins. In another example, a stand-alone program is used to support VoIP communication. This can make softphone functionality difficult for developers of web pages and Rich Internet Applications (RIAs) to leverage, since a developer who desires to implement phone technology in an application will generally have to rely on the functionality provided by a web browser plug-in or other program with little flexibility for User Interface (UI) concerns or application-specific concerns. Further, since there are different browser plug-ins available, not every application will work with every browser. There is no solution currently on the market that gives developers control over real-time communication functionality and can be nearly universally useable.

In addition, voice communication has traditionally been initiated by users through interacting with a voice-centric application. That is, a user desiring a voice communication with another user traditionally invokes a softphone application (or uses a hand-set telephone, mobile telephone, etc.), and interacts with a user interface (e.g., a touchpad) to initiate a call to the other user.

As mentioned above, users who access common virtual spaces are often desirous of communicating with each other. However, unlike the traditional environment in which users working on a common project are located at a common physical location (e.g., in a common conference room, cubicle environment, etc.) in which users can readily communicate face-to-face with each other, no such ready communication exists in virtual spaces. For instance, in a traditional environment, those persons who walk into a common conference room are readily able to speak to each other without any further action being required by the persons, but users who access a same virtual space (e.g., a common website, common desktop application, etc.) are not afforded such ready communication with each other. While the users of a given virtual space may be communicatively connected in some instances, additional burdens have been placed on the users in order to initiate such communication capability in each instance. For example, at least one of the users must somehow recognize the other users who are in the virtual space, and such user must then take some action to initiate a call to the other users (e.g., using a softphone or other voice-centric application). Thus, voice communication between users has traditionally been thought of as being separate and distinct from any virtual spaces (or environments) in which the users may be interacting.

In some cases, conferences (e.g., telephony and/or video-conferences) may be set-up by a user (e.g., a "conference host"), and other users may perform some login action in order for the various users to be conferenced together. However, setting up and logging into such a conference are additional burdens required for users of a common virtual space to be communicatively coupled together. That is, the users are not able to talk with each other by mere virtue of being in a common virtual space (as are persons who are in a common physical location, such as in a common conference room), but are instead required to perform additional actions of setting up a conference, logging into the conference, and are typically required to use some communication-centric application (e.g., softphone, etc.) to connect to and participate in the conference. Further, such pre-arranged conference is not ad-hoc, but is instead limited to enabling communication between users who login to the conference during the conference's scheduled time. Users who are present in a virtual space at any arbitrary time are not able to communicate with each other through such a traditional conferencing scheme in a manner similar to users who are present in a common physical location (e.g., physical conference room) at any arbitrary time can.

Certain websites are beginning to include a link that when activated by a user establishes a voice connection between the user and a predefined endpoint, such as a call center. For instance, a company's website may offer a hyperlink to "connect to an agent," which when clicked by a client user who is viewing the website establishes a voice communication (e.g., VOIP call) between the user and a predefined endpoint (e.g., an agent at the company's call center). However, this is limited to enabling users to connect to a predefined endpoint, rather than supporting voice communication between any arbitrary users who may be accessing a common virtual space. Further, this solution of the prior art is restricted to application in a web environment (e.g., to users who are accessing a particular website that offers the hyperlink on it), and has not afforded voice communication between users of other types of virtual spaces, such as users of desktop applications, etc.

In view of the above, a desire exists for an improved system and method for enabling communication, particularly voice communication, between users of common virtual spaces.

SUMMARY

The present disclosure is directed generally to systems and methods for enabling voice communication between users of common virtual spaces. Certain embodiments provide a solution in which users who are accessing a common virtual space may be autonomously communicatively connected with each other. Accordingly, in certain embodiments, the users who access a common virtual space are capable of readily communicating with each other in a manner similar to persons who access a common physical location (e.g., common conference room, etc.). For instance, according to certain embodiments, users who enter a given virtual space have a voice communication connection (e.g., VOIP connection) autonomously initiated with other users who are accessing the given virtual space, whereby the users in the given virtual space may readily speak to each other. Thus, rather than being required to identify the other users and interact with an interface (such as a traditional telephone keypad) to connect to the other users, the users may be autonomously connected by virtue of accessing a common virtual space without being required to individually take further action for establishing the connections. In addition to voice communication, the users who enter a given virtual space may have other types of communication connections (e.g., video conferencing connection, data connection, etc.) autonomously initiated with other users who are accessing the given virtual space, whereby the users in the given virtual space may readily communicate corresponding types of information with each other.

According to certain embodiments, the communicative connection is "autonomous" because no action is required by the user to initiate the communication connection in each instance. For instance, according to certain embodiments, the user is not required to perform such administrative actions as: somehow determining the other users who are accessing the virtual space, determining how to communicatively connect (e.g., make a voice call) to the users, and initiate such communicative connection. Instead, according to certain embodiments, such users of a common virtual space who are to be communicatively connected are identified by a communication manager, and such communication manager autonomously initiates the communication connections between the identified users. Thus, responsive to the user accessing a virtual space, the user is communicatively connected with other users accessing such virtual space without requiring each user to perform an additional action to initiate such communication connection(s). Accordingly, these administrative burdens of communication management for the virtual space are alleviated from the users.

In addition, the virtual spaces (e.g., software applications) need not be communication-centric spaces. For instance, the virtual spaces may be software applications that provide a primary functionality other than enabling communication between parties. For example, the virtual spaces may be software development applications, animation-editing applications, image-editing applications, gaming applications, etc., which enable users to perform such tasks as authoring software applications, authoring/editing images and/or animation, play games, etc. Embodiments enable communication to be further supported such that users of common virtual spaces that are not communication centric can be autonomously placed in communication with each other. Thus, the users are not required to employ such communication-centric applications as a softphone (e.g., a voice-communication centric application), instant messaging, chat room, etc., in order to communicate with each other, but rather according to certain embodiments the users can be autonomously placed in communication with each other responsive to them accessing a common virtual space, similar to users who access a common physical conference room are readily able to communicate with each other without being required to initiate separate communication applications.

Additionally, the communication solution of one embodiment supports ad hoc activities of users, whereby communication is autonomously enabled between users as they enter a common virtual space without requiring pre-scheduled or otherwise pre-arranged communication sessions, such as those commonly required with the above-mentioned conferencing schemes of the prior art. Instead, according to certain embodiments, the communication manager monitors the users to determine those who are accessing a common virtual space at any given time, and autonomously initiates communication connections between those users without requiring any pre-scheduling between the individual users. In addition, the communication manager can autonomously terminate the communication connection with a user who departs a given virtual space.

In addition, as described further herein, the communication management solution of certain embodiments is not limited in application to communication between parties accessing websites, but may likewise be applied to enable communication between parties accessing various types of virtual spaces, including as examples applications executing locally on a client computing device. Thus, users who are accessing a particular type of local application (e.g., a given software development application, a given animation-editing application, a given image-editing application, a given software gaming application) on a client computing device (e.g., a personal computer (PC), laptop computer, personal digital assistant (PDA), mobile telephone, set-top or handheld gaming console, etc.) may be autonomously communicatively connected to each other. Further, the users need not be using the same types of client computing devices. For instance, one user may be accessing a local application on a PC, while another user may be accessing a local application of a common type on a laptop.

Further, in some instances, a given virtual space may be defined as encompassing one or more local applications, as well as one or more websites. Thus, those users who are accessing one or more local applications (e.g., one or more types of software development applications) and those users who are accessing one or more websites (e.g., a web application for software development) may all be communicatively connected together. As an example, suppose a team of software developers of a given company are working on a common project, and further suppose that the software developers are geographically distributed. Moreover, suppose that the software developers choose to use different software development applications for coding their respective portions of the project (e.g., one developer may choose to use DREAM WEAVER, while another user chooses to use a different software development tool, which may be an application executing locally on a client computing device or a web-based application, as examples). In certain embodiments, a virtual space may be defined (e.g., at the communication manager, as described further below) to encompass the various different software development applications such that any of these developers who are accessing any of the different software development applications at any given time are autonomously communicatively connected together (e.g., via VOIP).

According to certain embodiments, a communication manager is provided that autonomously identifies a plurality of users who are accessing a common virtual space, and autonomously initiates communication between the plurality of users. Again, the common virtual space may be predefined at the communication manager as encompassing any number of software applications (which may reside locally on client computers and/or which may be network-accessed applications, such as websites). Of course, a plurality of different virtual spaces may be defined, and thus peer groups of clients who are accessing each of the plurality of different virtual spaces may be determined. For instance, a first virtual space may be defined as corresponding to clients who are accessing a given software development application(s), another virtual space may be defined as corresponding to users who are accessing a first website (or a particular portion/page of such first website), another virtual space may be defined as corresponding to users who are accessing a second website (or a particular portion/page of such second website), yet another virtual space may be defined as corresponding to users who are accessing a navigation application(s), and still another virtual space may be defined as corresponding to users who are accessing a particular video game (or a particular level or region of such particular video game), etc. Any number of virtual spaces may be defined, and each virtual space may be defined to include any number of software applications (which may be executing locally on a client device, accessed via network (e.g., website), etc.).

In one embodiment, the communication manager comprises peer group identifying logic that is operable to identify a plurality of users who are accessing a common virtual space. For instance, such peer group identifying logic may determine those users who are accessing a common virtual space in any of a variety of ways. As one example, a communication module (e.g., software application) may reside on each client device, which may communicate information to the communication manager regarding the virtual space being accessed by the client device. For instance, in response to a user of the client device loading a particular desktop application or accessing a particular website, the client communication module may communicate information to the communication manager to inform the server that the user has accessed the corresponding virtual space. As described further herein, such a communication module may be implemented as a light-weight application that can be downloaded (or otherwise installed) to the client's computing device. According to certain embodiments, such communication module is implemented as part of Adobe Systems Incorporated's FLASH PLAYER or Adobe Systems Incorporated's AIR, but any implementation of a communication module that functions substantially as described herein is within the scope of the present disclosure.

In certain embodiments, the peer group identifying logic may identify all users who are accessing a given virtual space as being included in a peer group such that they are autonomously communicatively connected together. Of course, the peer group identifying logic may, in certain embodiments, determine a given peer group of users who are to be communicatively connected together as being some subset of all users who may be accessing the particular virtual space. For instance, all users who are employees of a particular company (and/or who are designated as assigned to a particular task) who are accessing a given virtual space (e.g., a common software development application) may be identified as a peer group that are to be communicatively connected together. In this manner, rather than communicatively connecting all users of a given virtual space (e.g., all users accessing a particular software development application), the peer group identifying logic may, in certain embodiments, selectively form certain ones of those users who are in the virtual space into a peer group that is to be communicatively connected together. The peer group identifying logic may employ certain predefined rules and/or information to determine those users of a given virtual space who are to be communicatively connected together.

In one embodiment, the communication manager further comprises connection management logic that is operable to autonomously initiate communication between the plurality of users who are identified (by the peer group identifying logic) as accessing a common virtual space (e.g., a common desktop application, website, etc.). In certain embodiments, the communication manager communicates with a communication module on each client to cause each communication module to communicatively connect with the communication module of the other users in an identified peer group. Such autonomous initiation of communication by the connection management logic does not require any initiation by any of the users. Thus, in certain embodiments, by mere virtue of the users accessing a common virtual space they may be communicatively connected (e.g., with a voice connection to each other).

As mentioned above, in certain embodiments, a light-weight communication module may be implemented on each client, which provides logic for enabling voice communication between the clients who are determined by the communication manager as being members of a peer group who are accessing a common virtual space. Such communication module may employ any suitable communication logic, but is most preferably a light-weight module to enable ready adoption by many different types of client devices. Again, in certain embodiments, such communication module is implemented as part of Adobe Systems Incorporated's FLASH PLAYER or Adobe Systems Incorporated's AIR, but any implementation of a communication module that functions substantially as described herein is within the scope of the present disclosure.

According to certain embodiments, the communication module may employ communication technology such as the underlying communication technology disclosed in co-pending and commonly assigned U.S. patent application Ser. No. 11/611,046 titled "INTERFACE-NEUTRAL COMMUNICATION ARCHITECTURE" filed Dec. 14, 2006, and co-pending and commonly assigned U.S. patent application Ser. No. 11/611,019 titled "REAL-TIME COMMUNICATION USING INTER-PROCESS COMMUNICATIONS" filed Dec. 14, 2006, the disclosures of which are incorporated by reference herein. In general, those co-pending applications describe systems, computer program products, and methods which give developers control over real-time communication by providing techniques to implement communication functionality in end-user applications and also by providing programs that support media streaming and are controlled by the end-user applications. Additionally, those co-pending applications generally describe systems, methods, and computer program products for implementing real-time voice communication technology in end user applications (e.g., web pages, banner advertisements, Rich Internet Application (RIAs), and the like) using an interface-neutral calling engine. Various embodiments disclosed in those co-pending applications can provide real-time voice/video/data communication using VoIP techniques, video conference techniques, peer-to-peer techniques, and the like. As described further herein, certain embodiments enable such communication technologies to be employed for autonomously connecting users who are determined as being part of a peer group accessing a common virtual space, thus alleviating the users from having to take action (e.g., dialing on a telephone pad interface, etc.) to initiate the connection.

According to certain embodiments, users may setup profiles that specify their individual preferences regarding communication with other users. Such profiles may be in the form of digital data stored to a computer-readable medium as any suitable data structure (e.g., flat file, table, database, spreadsheet, etc.). Thus, the profile information may be read by a computer device. For instance, the profile may specify whether and/or when (e.g., under what conditions) the user is to be autonomously connected with other members of a determined peer group. In addition, the profile may specify what information (e.g., identification information, personal information, etc.) is to be communicated to other users in a given virtual space. Various rules may be defined in the profiles, and the communication manager may follow the user-specified rules in determining whether to autonomously connect a given user to other members of a determined peer group and/or in determining what information to communicate from the user to other members of the determined peer group. For instance, in certain embodiments, identification information (e.g., a name, "handle", or other information that identifies a given user) may be communicated to other members of a peer group with whom the given user is connected, whereby the identification information may be presented on a user interface to the other members In some instances, personal information about a user may be set in the user's profile to be exchanged with other users. Such personal information may include a variety of information such as information identifying how to contact the user (i.e., the user's contact information, such as email address, telephone number(s), etc.), the user's employer and/or occupation, the user's personal calendar of appointments (such that other users can determine the user's availability at various times), the user's interests/hobbies, the user's relationship status (e.g., single and looking for a mate, married, etc.), the user's educational alumni, the user's personal images (e.g., photographs), et cetera. Such personal information may be communicated to other users with whom the user is connected, and the information may be displayable on a user interface to the other users. By selectively choosing to share some or all of this personal information with other users in a given virtual space, the user may be able to identify other users in the virtual space who share a common interest beyond their mere presence in the virtual space and/or otherwise enhance the communication exchange with other users in the shared virtual space.

The profile information may be setup directly with the communication manager in certain embodiments, while in other embodiments all or a portion of the profile information may be inherited by the communication manager from another source. For example, a user may establish a user profile for a given website that specifies the user's preferences, personal information, etc. Such website may be defined as a virtual space, and the communication manager may utilize the user's preferences defined in the profile for that website in managing the communication connection and information communicated to other users when the user is accessing this defined virtual space. In this manner, the user may define different profiles for different virtual spaces (e.g., different websites), and the communication manager inherits those profiles and employs them to manage the user's communication accordingly in each of the virtual spaces. For example, a user may setup a first profile for a virtual space that the user shares with friends and/or family members (e.g., www.myfamily.com) in which the user specifies to share a first set of information with users in that virtual space (e.g., sharing personal information, etc.), and the user may setup a second profile for a virtual space that the user shares with co-workers (e.g., a software development application space) in which the user specifies to share a second set of information with users in that virtual space (e.g., which does not share certain personal information).

In certain embodiments, information regarding each user's physical location may be communicated to the communication manager, and such information may be further used in certain embodiments to determine peer groups. For instance, a client computing device may include information regarding its physical location (e.g., a GPS system), and the client computing device may communication such geographic location information to the communication manager (e.g., the information may be communicated periodically and/or as such information changes). As an example, users of a navigation application who are within a certain geographic range of each other may be autonomously connected together in certain embodiments. In this way, a user of a navigation system who is driving along a particular route may be placed in communication (e.g., voice communication) with other users of such a navigation system who are on the particular route and/or otherwise within a particular geographic region relative to the user such that the users can readily exchange information with each other regarding traffic conditions, road closures, speed traps, etc.

Information identifying the users in a particular virtual space may be autonomously exchanged in certain embodiments, and a user interface on each client device may display information to the users that identifies all other users with whom the user is communicatively connected in a given virtual space. In certain embodiments, the users may invite other users to join a private conference (in a manner analogous to a subset of persons in one conference room breaking out into a separate conference room), whereby the users who join such a private conference are capable of communicating with each other separate/private from other users in the virtual space. Further, users may be capable of muting their voice communication, terminating the communicative connection (while remaining in the virtual space), and/or otherwise managing the communication with other users with whom the user is connected in a given virtual space, etc.

Just as there may be certain established rules of communication exchanged between parties in a physical conference room (such as only one person speaking at a time, etc.), there may be similar mechanisms established for governing communication between parties in a virtual space in certain embodiments. For instance, in one embodiment, controls may be put in place (e.g., managed by the client communication modules or the communication manager) to control communication such that users request a virtual "microphone" which is passed along to them (e.g., upon a pre-set amount of silence from the current holder of the virtual microphone) so that only one person at a time is permitted to speak to other members who are connected. However, while various mechanisms may be put in place for managing the communication exchange between the parties in a given virtual space (which may require some interaction by the parties with a user interface, for instance), the individual parties are not required to manage the communication connection, such as by identifying the users in the space, scheduling some communication session with other users, initiating a connection with other users, etc. Further, in certain embodiments, no or relatively little controls may be put in place regarding the communication, but the rules/conduct of communication may instead be left up to the members of each peer group who are connected together. For instance, the voice communication may be "open" such that all parties can talk at any time to the other parties who are connected, analogous to an open discussion by persons in a common physical conference room.

Certain embodiments provide an enhanced shared experience by effectively integrating into various virtual spaces (e.g., software applications) support for various sharing actions, such as voice communication (VOIP), sharing of authored content, sharing of presence information identifying members of a peer group that are currently online, etc. According to certain embodiments, a voice communication feature is easily integrated into an application, such as a development application, through installation of a client communication module, which enables members of a peer group who are accessing a common virtual space (i.e., using the application) to easily conduct voice communication with each other. For instance, a development application, such as a video production application, may include support for a primary function, such as authoring content (e.g., a video), and the client communication module may further include support for voice communication and/or other sharing of information between peer group members according to embodiments. Further, the virtual spaces (e.g., software applications) need not be communication-centric applications. For instance, rather than requiring a user to use a separate softphone application, the voice communication capability appears to the user as an offering of the virtual space itself. Thus, the user of an application that has functionality that is not communication-centric (e.g., a software development application, animation-editing application, image-editing application, website, gaming application, and/or other applications that provide a primary functionality other than enabling communication between parties) appears to provide the autonomous communication capability described further herein.

The foregoing has outlined rather broadly the features and technical advantages of embodiments in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes. It should also be realized by those skilled in the art that such equivalent constructions do not depart from the spirit and scope of the concepts as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the claims.

BRIEF DESCRIPTION OF THE DRAWINGS

For a more complete understanding of the present disclosure, reference is now made to the following descriptions taken in conjunction with the accompanying drawing, in which:

FIG. 1B shows another block diagram of an exemplary system according to an embodiment, which illustrates that the communication manager may be implemented in a distributed manner;

DETAILED DESCRIPTION

Figure 1A:
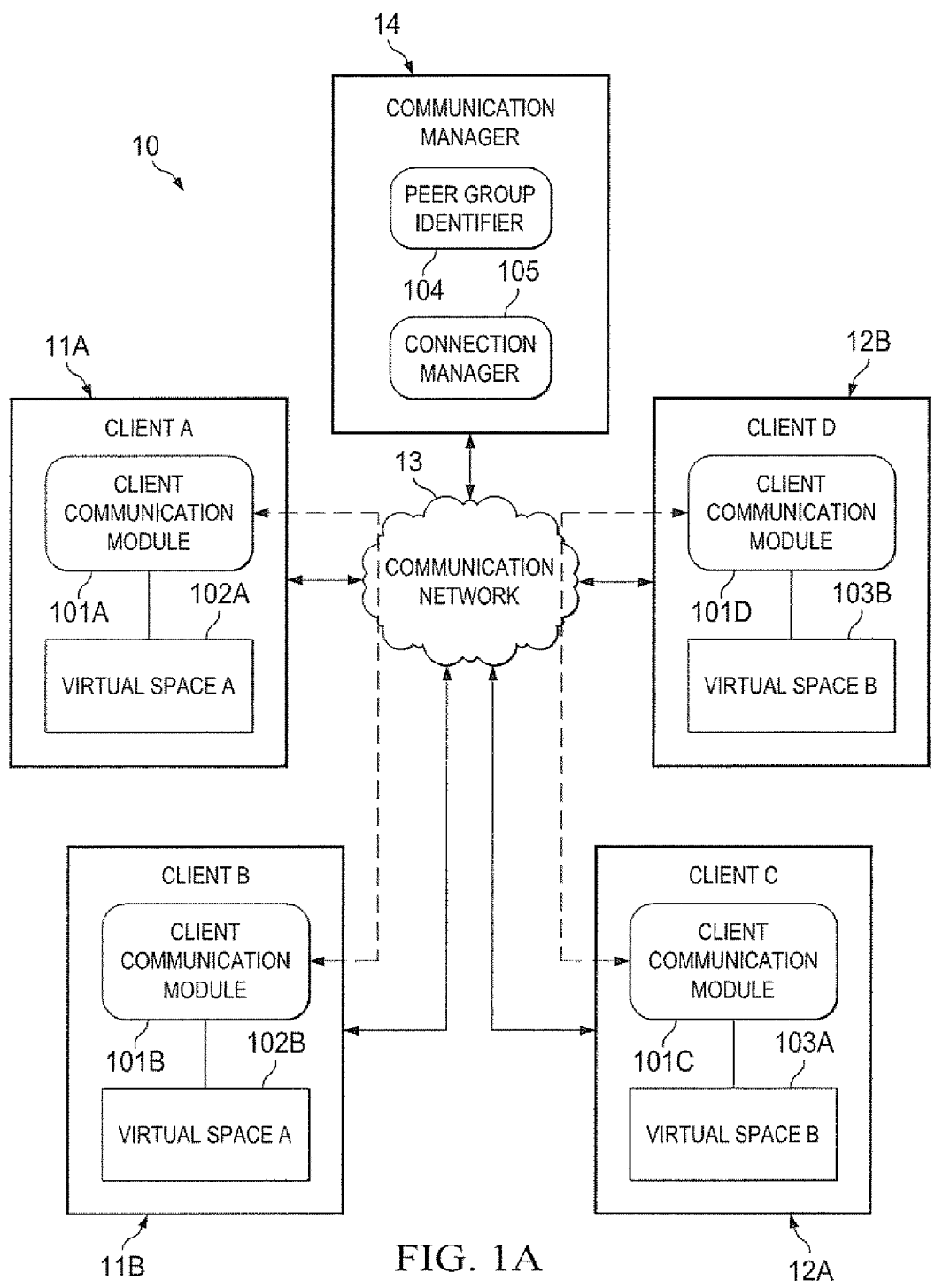
FIG. 1A shows a block diagram of an exemplary system according to one embodiment.

FIG. 1A shows a block diagram of an exemplary system 10 according to one embodiment. System 10 comprises client computing devices 11A, 11B, 12A, and 12B that are communicatively coupled to communication network 13. System 10 further comprises communication manager 14 that is communicatively coupled to communication network 13. Communication network 13 may be the Internet or other Wide Area Network (WAN), an Intranet, a Local Area Network (LAN), a public-switched telephony network, a wireless network, and/or any other network that permits computing devices to communicate information to each other as described herein.

Client computing devices 11A, 11B, 12A, and 12B comprise client communication modules 101A-101D, respectively. As described further herein, such client communication modules may be operable to communicate information to communication manager 14, as well as communicate with other peer group members with whom the client computing device is communicatively connected. As mentioned above, in certain embodiments, a light-weight communication module 101A-101D may be implemented on each client 11A, 11B, 12A, 12B, which provides logic for enabling communication (e.g., voice communication, etc.) between the clients who are determined by the communication manager 14 as being members of a peer group who are accessing a common virtual space. Such communication module may employ any suitable communication logic, but is most preferably a light-weight module to enable ready adoption by many different types of client devices. Again, in certain embodiments, such communication module 101A-101D is implemented as part of Adobe Systems Incorporated's FLASH PLAYER or Adobe Systems Incorporated's AIR, but any implementation of a communication module that functions substantially as described herein is within the scope of the present disclosure.

According to certain embodiments, the communication module 101A-101D may employ communication technology such as the underlying communication technology disclosed in co-pending and commonly assigned U.S. patent application Ser. No. 11/611,046 titled "INTERFACE-NEUTRAL COMMUNICATION ARCHITECTURE" filed Dec. 14, 2006, and co-pending and commonly assigned U.S. patent application Ser. No. 11/611,019 titled "REAL-TIME COMMUNICATION USING INTER-PROCESS COMMUNICATIONS" filed Dec. 14, 2006, the disclosures of which are incorporated by reference herein. In general, those co-pending applications describe systems, computer program products, and methods which give developers control over real-time communication by providing techniques to implement communication functionality in end-user applications and also by providing programs that support media streaming and are controlled by the end-user applications. Additionally, those co-pending applications generally describe systems, methods, and computer program products for implementing real-time voice communication technology in end user applications (e.g., web pages, banner advertisements, Rich Internet Application (RIAs), and the like) using an interface-neutral calling engine. Various embodiments disclosed in those co-pending applications can provide real-time voice/video/data communication using VoIP techniques, video conference techniques, peer-to-peer techniques, and the like. As described further herein, certain embodiments enable such communication technologies to be employed for autonomously connecting users who are determined as being part of a peer group accessing a common virtual space, thus alleviating the users from having to take action (e.g., dialing on a telephone pad interface, etc.) to initiate the connection.

As further illustrated in the example of FIG. 1A, each of clients 11A, 11B, 12A, and 12B are accessing at least one virtual space. For instance, clients 11A and 11B are accessing a virtual space A 102A, 102B, while clients 12A and 12B are accessing a virtual space B 103A, 103B. As described further herein, each virtual space may be predefined as corresponding to any one or more software applications (which may be executing locally on a client computing device or a web-based application (e.g., websites), as examples). As described further herein, the communication management solution of certain embodiments are not limited in application to communication between parties accessing websites, but may likewise be applied to enable communication between parties accessing various types of virtual spaces, including as examples applications executing locally on a client computing device. Thus, users who are accessing a particular type of local application (e.g., a given software development application, a given animation-editing application, a given image-editing application, a given software gaming application) on a client computing device (e.g., a personal computer (PC), laptop computer, personal digital assistant (PDA), mobile telephone, set-top or handheld gaming console, etc.) may be autonomously communicatively connected to each other. Further, the users need not be using the same types of client computing devices. For instance, one user may be accessing a local application on a PC, while another user may be accessing a local application of a common type on a laptop.

Further, in some instances, a given virtual space (e.g., virtual space A or virtual space B of FIG. 1A) may be defined as encompassing one or more local applications, as well as one or more websites. Thus, those users who are accessing one or more local applications (e.g., one or more types of software development applications) and those users who are accessing one or more websites (e.g., a web application for software development) may all be considered as accessing a common virtual space. As an example, suppose a team of software developers of a given company are working on a common project, and further suppose that the software developers are geographically distributed. Moreover, suppose that the software developers choose to use different software development applications for coding their respective portions of the project (e.g., one developer may choose to use DREAMWEAVER, while another user chooses to use a different software development tool, which may be an application executing locally on a client computing device or a web-based application, as examples). In certain embodiments, a virtual space (e.g., virtual space A and/or virtual space B of FIG. 1A) may be defined (e.g., at the communication manager 14, as described further herein) to encompass the various different software development applications such that any of these developers who are accessing any of the different software development applications at any given time are autonomously communicatively connected together (e.g., via VOIP).

According to certain embodiments, a communication manager 14 is provided that autonomously identifies a plurality of users who are accessing a common virtual space, and autonomously initiates communication between the plurality of users. Again, the common virtual space may be predefined at the communication manager as encompassing any number of software applications (which may reside locally on client computers and/or which may be network-accessed applications, such as websites). Of course, a plurality of different virtual spaces may be defined, and thus peer groups of clients who are accessing each of the plurality of different virtual spaces may be determined. For instance, a first virtual space (e.g., virtual space A of FIG. 1A) may be defined as corresponding to clients who are accessing a given software development application(s), another virtual space (e.g., virtual space B of FIG. 1A) may be defined as corresponding to users who are accessing a first website (or a particular portion/page of such first website), another virtual space may be defined as corresponding to users who are accessing a second website (or a particular portion/page of such second website), yet another virtual space may be defined as corresponding to users who are accessing a navigation application(s), and still another virtual space may be defined as corresponding to users who are accessing a particular video game (or a particular level or region of such particular video game), etc. Any number of virtual spaces may be defined, and each virtual space may be defined to include any number of software applications (which may be executing locally on a client device, accessed via network (e.g., website), etc.).

In one embodiment, communication manager 14 comprises peer group identifying logic 104 that is operable to identify a plurality of users (e.g., clients 11A and 11B and/or clients 12A and 12B of FIG. 1A) who are accessing a common virtual space (e.g., virtual space A or virtual space B of FIG. 1A). For instance, such peer group identifying logic 104 may determine those users who are accessing a common virtual space in any of a variety of ways. As one example, communication module (e.g., software application) 101A-101D may reside on each of client devices 11A, 11B, 12A, 12B, which may communicate information to communication manager 14 regarding the particular virtual space being accessed by the corresponding client device. For instance, in response to a user of client device 11A loading a particular desktop application or accessing a particular website (102A), the client communication module 101A may communicate information to communication manager 14 to inform the server that the user has accessed the corresponding virtual space (virtual space A in this example).

In certain embodiments, peer group identifying logic 104 may identify all users who are accessing a given virtual space as being included in a peer group such that they are autonomously communicatively connected together. Of course, the peer group identifying logic 104 may, in certain embodiments, determine a given peer group of users who are to be communicatively connected together as being some subset of all users who may be accessing the particular virtual space. For instance, all users who are employees of a particular company (and/or who are designated as assigned to a particular task) who are accessing a given virtual space (e.g., a common software development application) may be identified as a peer group that are to be communicatively connected together. In this manner, rather than communicatively connecting all users of a given virtual space (e.g., all users accessing a particular software development application), the peer group identifying logic 104 may, in certain embodiments, selectively form certain ones of those users who are in the virtual space into a peer group that is to be communicatively connected together. The peer group identifying logic 104 may employ certain predefined rules and/or information to determine those users of a given virtual space who are to be communicatively connected together.

As further shown in this exemplary system 10, communication manager 14 further comprises connection management logic 105 that is operable to autonomously initiate communication between the plurality of users who are identified (by the peer group identifying logic) as accessing a common virtual space (e.g., a common desktop application, website, etc.). In certain embodiments, the communication manager 14 communicates with a communication module 101A-101D on each client to cause each communication module to communicatively connect with the communication module of the other users in an identified peer group. Such autonomous initiation of communication by the connection management logic 105 does not require any initiation by any of the users. Thus, in certain embodiments, by mere virtue of the users accessing a common virtual space they may be communicatively connected (e.g., with a voice connection to each other).

In the illustrated example of FIG. 1A, client communication module 101A of client 11A communicates to communication manager 14 information indicating that client 11A is accessing virtual space A 102A. Similarly, client communication module 101B of client 111B communicates to communication manager 14 information indicating that client 11B is also accessing virtual space A 102B. Peer group identifying logic 104 processes this information to determine that clients 11A and 11B are accessing a common virtual space. In certain embodiments, further information may be evaluated, such as information identifying whether the clients 11A and 11B are employees working on a common project and/or have some other relationship to each other, etc., and peer group identifying logic 104 forms the clients 11A-11B into a peer group. Connection management logic 105 then causes client communication modules 101A and 101B to communicatively connect together. For instance, connection management logic 105, in certain embodiments, initiates client communication modules 101A and 101B to form a voice connection (e.g., VOIP connection) with each other. In this way, the determined peer group members (clients 11A and 11B) who are accessing a common virtual space (virtual space A) are autonomously communicatively coupled together without requiring any connection actions by the individual users beyond them simply accessing the virtual space A. Thus, the identified peer group members who enter virtual space A can readily communicate with each other in a manner analogous to members who enter a common physical conference room.

Additionally, in the illustrated example of FIG. 1A, client communication module 101C of client 12A communicates to communication manager 14 information indicating that client 12A is accessing virtual space B 103A. Similarly, client communication module 101D of client 12B communicates to communication manager 14 information indicating that client 12B is also accessing virtual space B 103B. Peer group identifying logic 104 processes this information to determine that clients 12A and 12B are accessing a common virtual space. In certain embodiments, further information may be evaluated, such as information identifying whether the clients 12A and 12B are employees working on a common project and/or have some other relationship to each other, etc., and peer group identifying logic 104 forms the clients 12A-12B into a peer group. Connection management logic 105 then causes client communication modules 101C and 101D to communicatively connect together. For instance, connection management logic 105, in certain embodiments, initiates client communication modules 101C and 101D to form a voice connection (e.g., VOIP connection) with each other. In this way, the determined peer group members (clients 12A and 12B) who are accessing a common virtual space (virtual space B) are autonomously communicatively coupled together without requiring any connection actions by the individual users beyond them simply accessing the virtual space B.

In certain embodiments, when a client departs a particular virtual space, the client's communication module communicates that information to communication manager 14, which in turn terminates the communication connection of that client from other peer group members in that virtual space to which the client was connected. As such, no action may be required by the user when departing a virtual space to terminate the communication connection (e.g., voice connection), but instead this termination may be handled autonomously by the communication manager and/or client communication module. According, the identified peer group members who depart a given virtual space may have their communication connection with other members in the virtual space autonomously terminated by virtue of the user departing the virtual space in a manner analogous to members who depart a physical conference room.

While communication manager 14 is shown as a separate block for ease of illustration in FIG. 1A (and many other FIGURES discussed herein below), it should be understood that communication manager 14 is not limited to be implemented as a centralized server. Rather, all or a portion of communication manager 14 may be implemented in a distributed manner, such as illustrated in the exemplary block diagram of FIG. 1B. For instance, all of communication manager 14 or select parts thereof (e.g., peer group identifier 104 and/or connection manager 105) may be loaded onto the client computers (e.g., may be downloaded to the clients from a server and/or otherwise installed onto the client computers), as illustrated with communication managers 14A-14D loaded on the clients 11A, 11B, 12A, and 12B in the example of FIG. 1B. The functions performed by the communication manager when implemented in such a distributed fashion are largely as described herein for communication manager 14, and such distributed implementation may be enabled through use of any suitable underlying peer-to-peer communication scheme, for example. In other embodiments, the communication manager 14 may be implemented as a centralized server and/or distributed across one or more servers and/or clients, and any such architectural implementation of the communication manager 14 is intended to be within the scope of the present application.

Figure 2A:
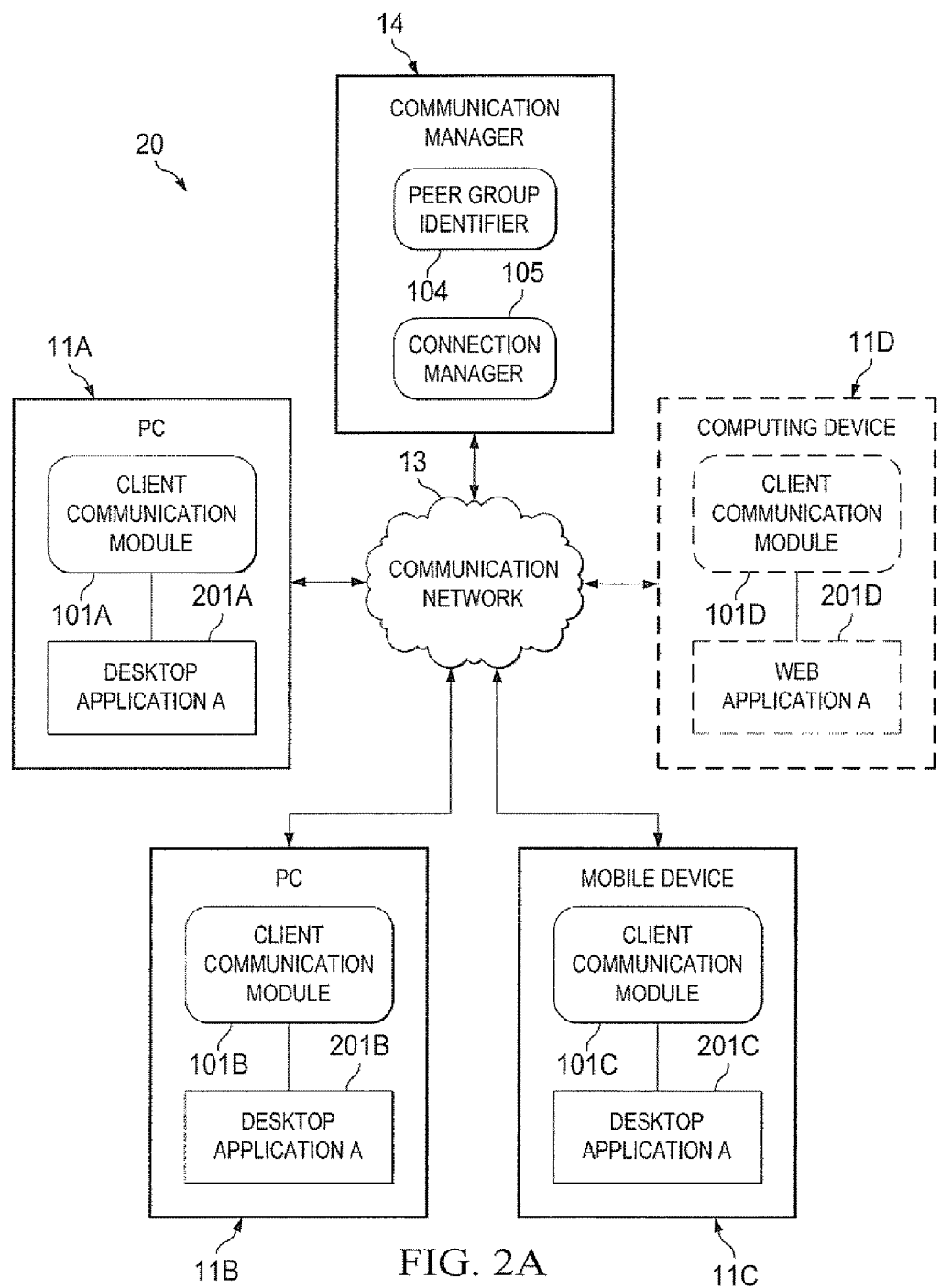
FIGS. 2A-2B show block diagrams illustrating exemplary scenarios of peer group members of virtual spaces according to certain embodiments.
Figure 2B:
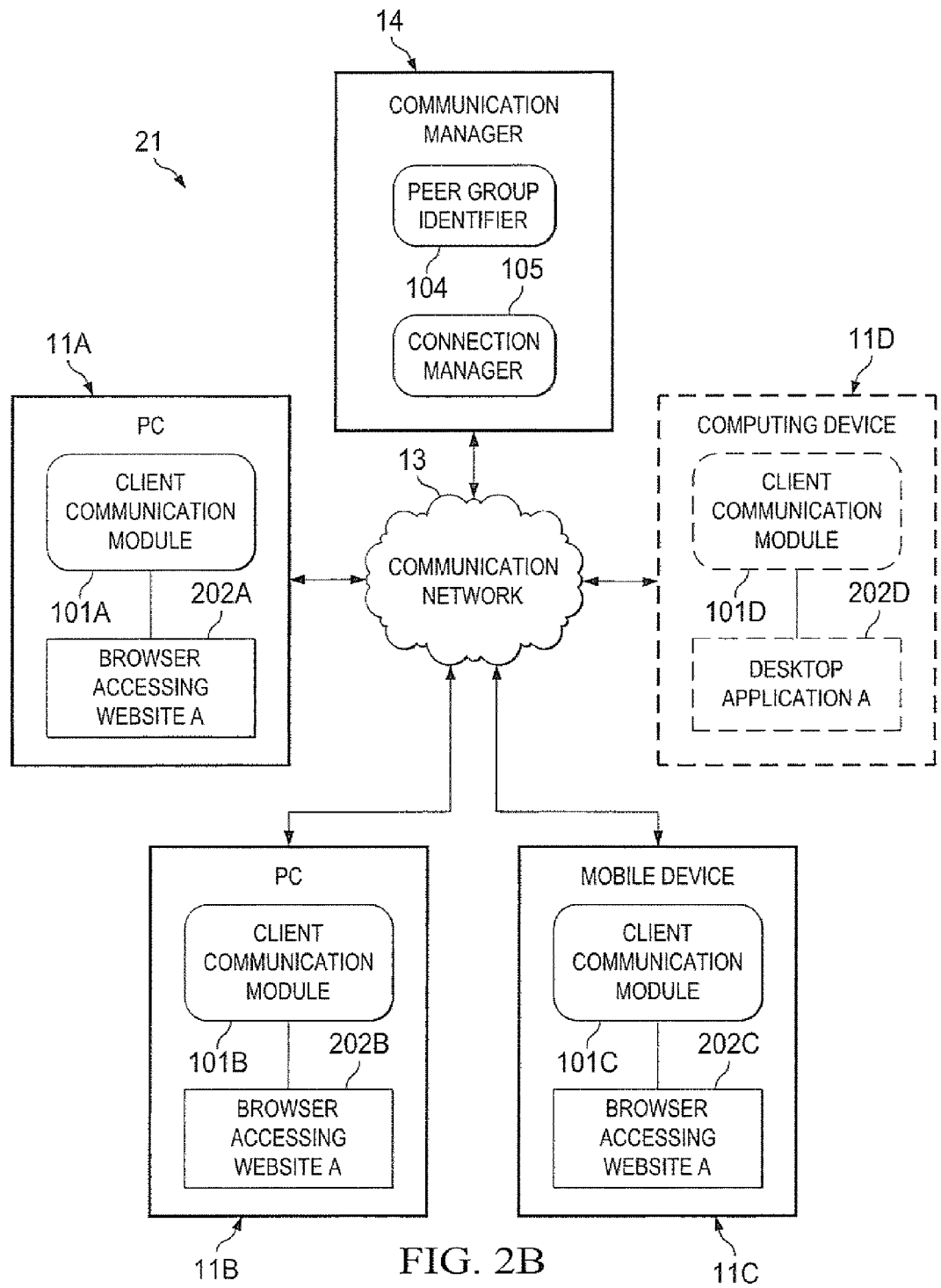

FIGS. 2A-2B show block diagrams illustrating exemplary scenarios of peer group members of virtual spaces according to certain embodiments. FIG. 2A shows a first exemplary scenario 20 of peer group members accessing a common virtual space. In this example, clients 11A-11C are each using a desktop application A 201A-201C (e.g., a particular software development application, animation-editing application, image-editing application, gaming application, or other application that is executing locally on each client device). In this example, clients 11A and 11B are PCs, while client 11C is a mobile computing device (e.g., a laptop, PDA, mobile telephone, handheld gaming device, etc.). The client communication module 101A-101C of each of the client devices 11A-11C communicates information to communication manager 14 identifying that the corresponding client is accessing desktop application A, and peer group identifying logic 104 of communication manager server 14 forms the clients 11A-11C into a peer group. As described further herein, such formation of the clients into a common peer group may, in some embodiments, be based on certain information in addition to them accessing the common virtual space, such as those members having a particular predefined relationship with each other (e.g., co-workers, family members, etc.). Further, connection management logic 105 causes the client communication modules 101A-101C to communicatively connect the clients 11A-11C together (e.g., via VOIP voice connections).

In addition, as shown in this example, the virtual space may be defined as encompassing not only the desktop application A, but also other desktop applications and/or network-accessed applications (e.g., websites). For instance, in the example of scenario 20 of FIG. 2A, a client 11D that comprises client communication module 101D is accessing a web application A 201D. The client communication module 101D communicates information to communication manager 14 identifying that the corresponding client is accessing web application A 201D, and peer group identifying logic 104 of communication manager server 14 may determine that client 11D is thus accessing the common virtual space (as such virtual space is defined in this example) along with clients 11A-11C. As such, group identifying logic 104 may form the clients 11A-11D into a peer group. Further, connection management logic 105 causes the client communication modules 101A-101D to communicatively connect the clients 11A-11D together (e.g., via VOIP voice connections).

FIG. 2B shows another exemplary scenario 21 of peer group members accessing a common virtual space. In this example, clients 11A-11C are each using a browser to access a website A 202A-202C. In this example, clients 11A and 11B are PCs, while client 11C is a mobile computing device (e.g., a laptop, PDA, mobile telephone, handheld gaming device, etc.). The client communication module 101A-101C of each of the client devices 11A-11C communicates information to communication manager 14 identifying that the corresponding client is accessing website A, and peer group identifying logic 104 of communication manager server 14 forms the clients 11A-11C into a peer group. As described further herein, such formation of the clients into a common peer group may, in some embodiments, be based on certain information in addition to them accessing the common virtual space, such as those members having a particular predefined relationship with each other (e.g., co-workers, family members, etc.). Further, connection management logic 105 causes the client communication modules 101A-101C to communicatively connect the clients 11A-11C together (e.g., via VOIP voice connections).

In addition, as shown in this example, the virtual space may be defined as encompassing not only the website A, but also other desktop applications and/or network-accessed applications (e.g., other websites). For instance, in the example of scenario 21 of FIG. 2B, a client 11D that comprises client communication module 101D is accessing a desktop application A 202D. The client communication module 101D communicates information to communication manager 14 identifying that the corresponding client is accessing desktop application A 202D, and peer group identifying logic 104 of communication manager server 14 may determine that client 11D is thus accessing the common virtual space (as such virtual space is defined in this example) along with clients 11A-11C. As such, group identifying logic 104 may form the clients 11A-11D into a peer group. Further, connection management logic 105 causes the client communication modules 101A-101D to communicatively connect the clients 11A-11D together (e.g., via VOIP voice connections).

Figure 3:
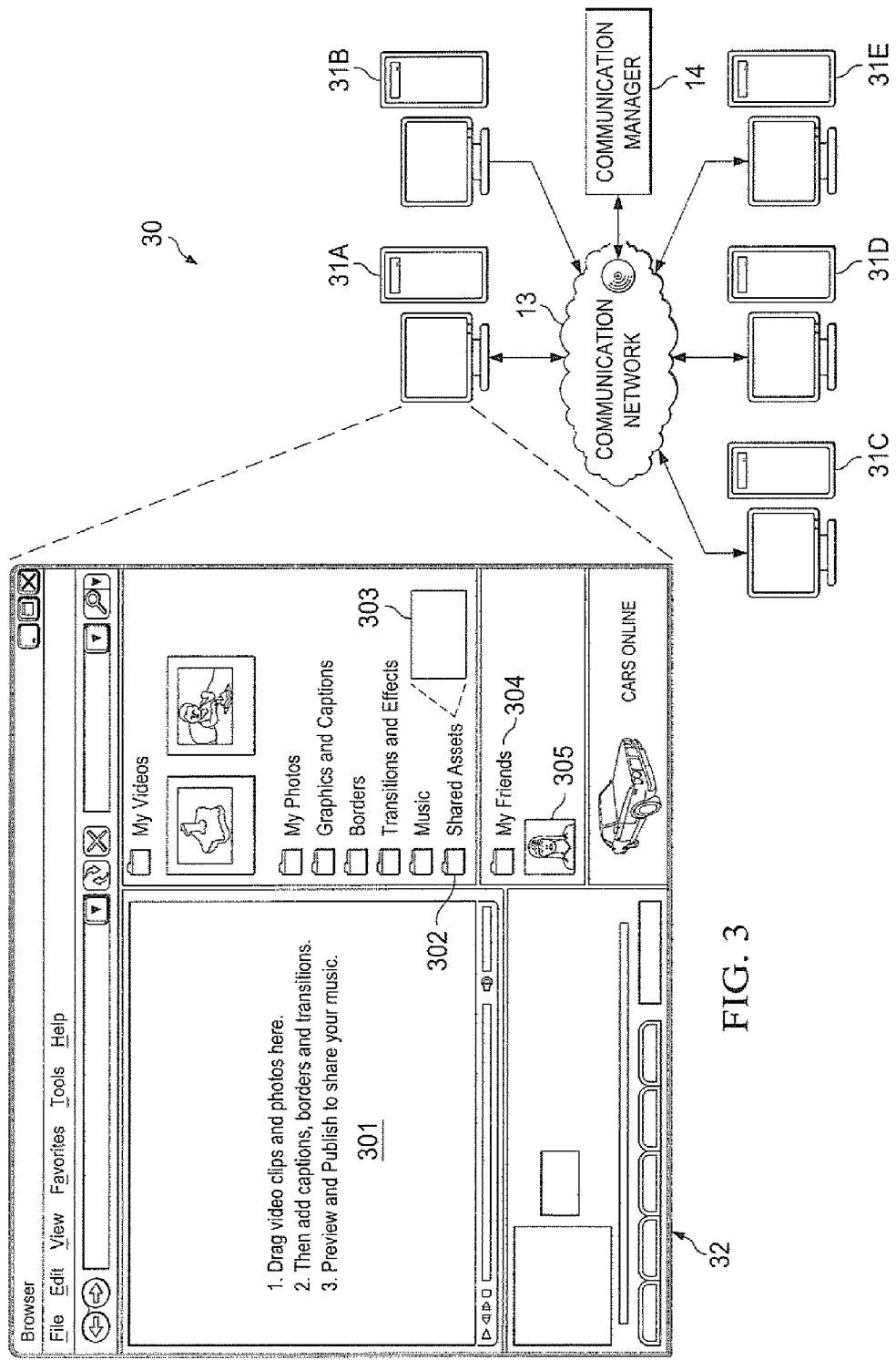
FIG. 3 is an illustration of an exemplary system, adapted according to one embodiment.

FIG. 3 shows an exemplary system 30 illustrating aspects of one embodiment. As shown, system 30 comprises processor-based computers 31A-31E, each of which may be any processor-based computer, such as a personal computer (PC), laptop computer, server computer, workstation computer, etc. Computers 31A-31E are communicatively coupled via a communication network 13, such as a local area network (LAN), the Internet or other wide area network (WAN), etc. Also coupled to communication network 13 in this exemplary embodiment is communication manager 14, which comprises a processor-based computer that is operable to determine ones of computers 31A-31B that are communicatively coupled to a common virtual space and can organize ones of those computers into peer groups as described further herein.

In this example, a user-interactive software application (e.g., web page, development application, etc.) 32 is executing on computer 31A. In the illustrative example of FIG. 3, application 32 is a development application, such as a video authoring application (e.g., ADOBE® PREMIERE®, which provides an online video remixing tool) or other content authoring application (e.g., software code development application, web page development application, etc.). As described further herein, certain embodiments enable an enhanced shared experience between users of computers 31A-31E for developing desired content, such as for producing a desired video. For instance, each of computers 31A-31E may be running a separate instance of a development application 32, similar to that illustrated for computer 31A.

In addition, each of computers 31A-31E comprise a client communication module that communicates information to communication manager 14 regarding the virtual space(s) being accessed by the respective computers 31A-31E. Thus, in the illustrated example, information is communicated to communication manager 14 indicating that each of computers 31A-31E are accessing a development application 32. Further, as described herein, communication manager 14 evaluates the received information and forms the clients 31A-31E into a peer group. As a result, communication manager 14 initiates the clients 31A-31E to form communication connections with each other. As described further hereafter, various types of information may be shared between the peer group members via such established communication connection(s).

In the illustrated example of FIG. 3, the user of computer 31A may interact with application 32 to author (e.g., view, modify, create, etc.) desired content, such as a desired video. The content may be viewed and edited in authoring region 301 of application 32. In certain embodiments, the application 32 may be accessible via a browser. In addition, development application 32 may include a shared region 303 to which assets (e.g., shared assets 302) can be placed for sharing with other members of the peer group (e.g., with other users of computers 31B-31E). For instance, a user of computer 31A can select a video (e.g., a video that the user may have created, edited, etc. via application 32) and drag and drop such selected video into the shared-access region 303 thus enabling other members of the peer group to share a view of the video. In this manner, for such video (and/or other assets) placed in shared-access region 303, the members of the peer group may share a view of such video so that they can jointly interact with the video. For instance, the video may be viewed jointly by all of the members of the peer group, and any of the members may edit the video, etc., and the edits will be reflected in the other members' views.

In addition, a voice communication connection and/or streaming videoconferencing connection may be established between the peer group members so that the users can readily talk to each other. Further, according to certain embodiments, an identification of members of the peer group that are online (i.e., connected as part of the peer group) at a given time may be indicated in region 304 of application 32. In the illustrated example, another member of the peer group (in addition to the user of computer 31A) is shown as currently connected, which is reflected by a corresponding identifying icon 305. Of course, an identification of each of members 31B-31E who are connected as part of peer group may be similarly displayed in the user interface on computer 31A. Communication manager 14 monitors communication network 13 to determine when members of the defined peer group come online or go offline (i.e., enter or depart the given virtual space). For instance, communication manager 14 may receive information from the client's respective client communication module regarding such arrival or departure to/from a given virtual space.

According to certain embodiments, a member of the peer group can easily talk with other members of the peer group because a voice communication connection is autonomously initiated without requiring the individual members to perform actions for connecting to each other member. In addition, in certain embodiments, a member of the peer group may be able to initiate a private communication with one or more other members by simply clicking the corresponding icon(s) identifying those members. As such, an enhanced shared environment is provided by certain embodiments. For instance, suppose that while sharing access to a video (in region 303 of application 32) with other members of a peer group, the user of computer 31A desires to speak with another member of the peer group; in this exemplary embodiment, the user can simply talk as he/she is autonomously connected to other members in the shared virtual space via VOIP. The exemplary techniques described further in co-pending and commonly assigned U.S. patent application Ser. No. 11/611,046 titled "INTERFACE-NEUTRAL COMMUNICATION ARCHITECTURE" filed Dec. 14, 2006 and co-pending and commonly assigned U.S. patent application Ser. No. 11/611,019 titled "REAL-TIME COMMUNICATION USING INTER-PROCESS COMMUNICATIONS" filed Dec. 14, 2006, the disclosures of which are hereby incorporated herein by reference, may be employed for enabling such VOIP capability by the client communication module.

In view of the above, certain embodiments enable an enhanced shared experience between members of a peer group, wherein a rich interaction between the users is enabled. That is, the members of the peer group can easily share content being authored in development application 32, and application 32 provides a user-friendly mechanism for enabling VOIP communication between peer members.

Figure 4:
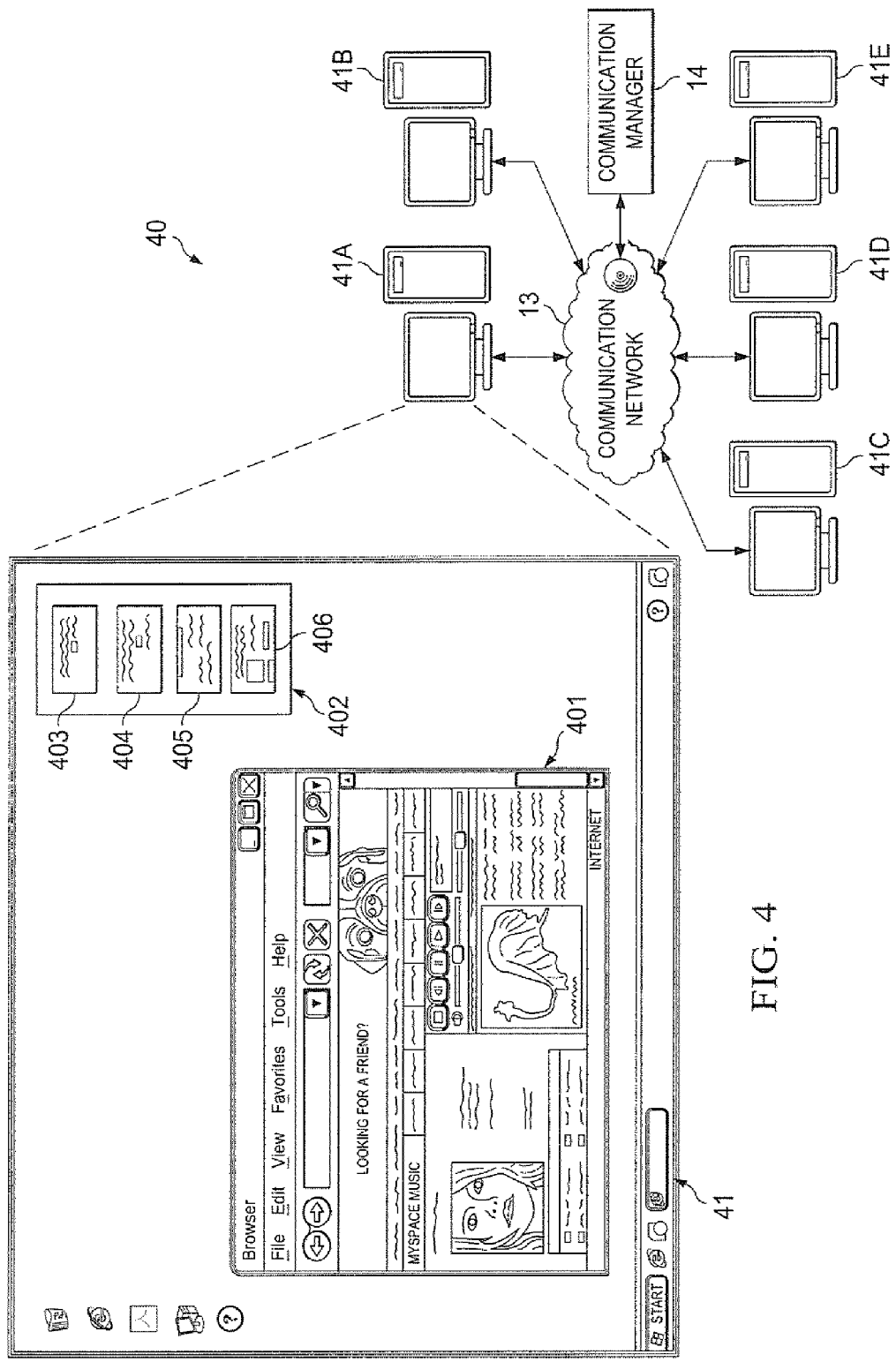
FIG. 4 is an illustration of an exemplary system adapted according to one embodiment.

Turning to FIG. 4, an exemplary system illustrating aspects of another embodiment is shown. As with the example of FIG. 3, the exemplary system of FIG. 4 comprises processor-based computers 41A-41E, each of which may be any processor-based computer, such as a personal computer (PC), laptop computer, server computer, workstation computer, etc. Computers 41A-41E are communicatively coupled via a communication network 13, such as a local area network (LAN), the Internet or other wide area network (WAN), etc. Also coupled to communication network 13 in this exemplary embodiment is communication manager 14, which comprises a processor-based computer that is operable to determine ones of computers 41A-41B that are sharing a common virtual space and which should be formed into a common peer group to be communicatively coupled together, as described further herein.

In this example, a user-interactive software application (e.g., web browser, development application, etc.) 41 is executing on computer 41A. In the illustrative example of FIG. 4, application 41 is a browser that is viewing a web page, such as a social networking web site (e.g., MySpace.com). Of course, in other embodiments, application 41 may comprise some other software application such as the exemplary development application 32 of FIG. 3. As described further herein, the various users of computers 41A-41E who are accessing this common virtual space may be formed into a peer group by communication manager 14 and autonomously connected together via a voice communication connection.

In addition to or instead of a voice communication connection, a communication connection for exchanging other types of information (other than voice) may be established between the peer group members. For instance, this exemplary embodiment further provides a "Presence" region 402 for a peer group, which identifies members of the peer group that are currently connected. For instance, identifiers 403-406 are included in presence region 406 in the illustrated example, wherein identifiers 403-406 identify peer group members that are currently accessing the shared virtual space via computers 41B-41E, respectively.

In this exemplary embodiment, identifiers 403-406 are dynamic icons that present a view of the page (e.g., web page) that the corresponding peer group member being identified is accessing. For instance, icon 406 presents a view of a web page that the user "Alice" of computer 41B is currently accessing. As Alice browses to a different page, an indication of such different page is communicated to other peer group members and the corresponding icon 406 is updated to reflect the different page that Alice is now accessing. According to one embodiment, the identification of the page being viewed by a given user may be communicated by the corresponding client communication module to communication manager 14, and communication manager 14 may send to other members of the peer group a "screen snapshot" of such page in the form of an icon associated with the corresponding user. Further, in certain embodiments, if the user of computer 41A desires to view the same page that Alice is currently viewing, the user may simply click icon 406, wherein browser 401 may access the page that Alice is viewing. For instance, along with the "screen snapshot", communication manager 14 may communicate to the other peer group members identification of a link to the page that Alice is currently viewing, whereby upon any user clicking the icon 403 of Alice's page, the user's computer browses to such link.

This further provides an enhanced shared experience between users of computers 41A-41E. In certain embodiments, the voice communication and/or authored content sharing features of development application 32 of FIG. 3 may further include the presence feature of application 41 of FIG. 4.

According to certain embodiments, communication manager 14 is utilized to define peer groups and communicate information to members of the peer groups regarding, for instance, which members are presently connected together within a common virtual space. However, once the peer groups are established, the members who are autonomously connected together can readily communicate with each other (e.g., via VOIP, sharing authored content, sharing presence information, etc.) without such communication being required to flow through communication manager 14. That is, once communication manager 14 updates the members as to which members are currently connected together, those members can communicate directly with each other via the connections established between their respective communication modules.

According to certain embodiments, users may setup profiles that specify their individual preferences regarding communication with other users. Such profiles may be in the form of digital data stored to a computer-readable medium as any suitable data structure (e.g., flat file, table, database, spreadsheet, etc.). Thus, the profile information may be read by a computer device (e.g., the For instance, the profile may specify whether and/or when (e.g., under what conditions) the user is to be autonomously connected with other members of a determined peer group.

Figure 5:
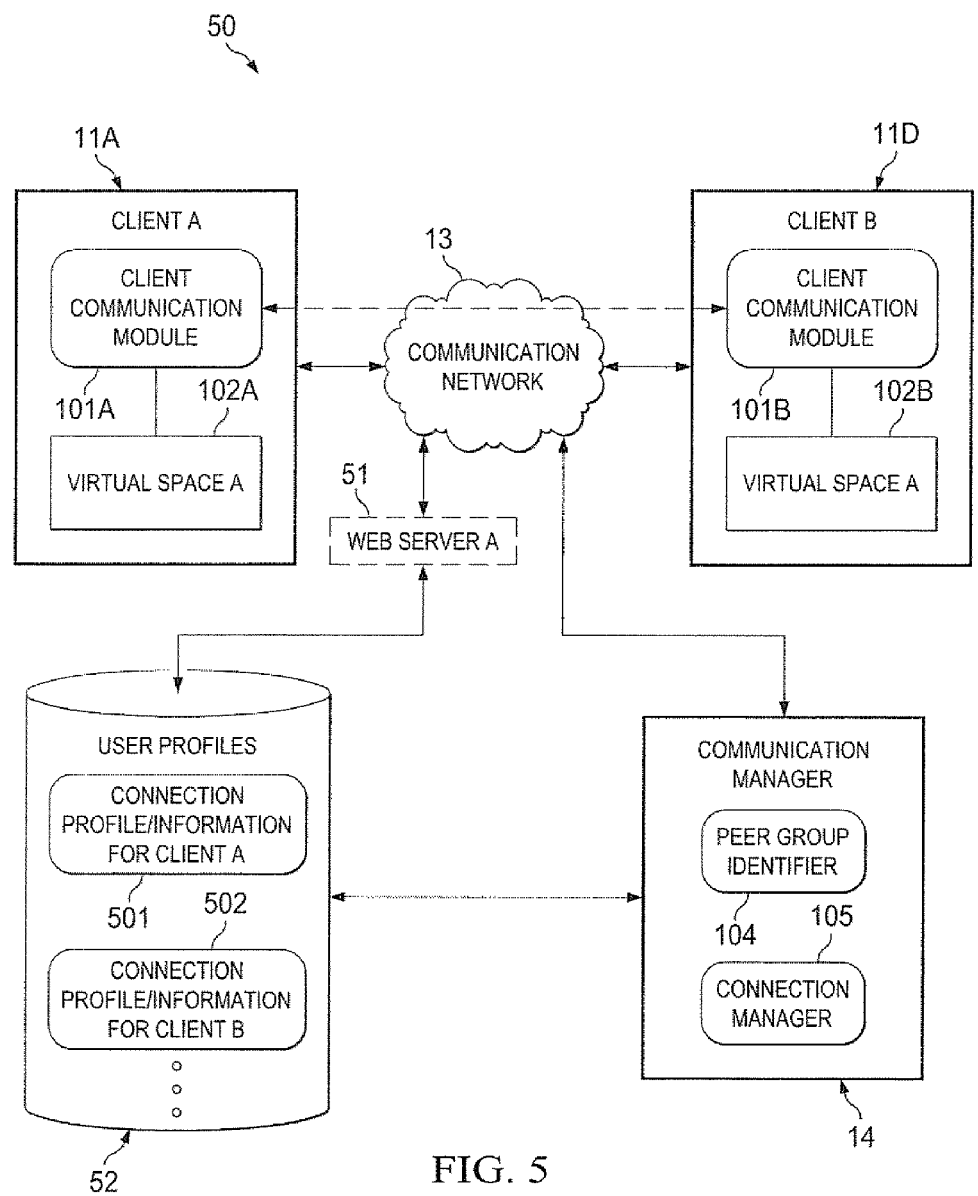
FIG. 5 shows a block diagram of an exemplary system in which user profiles are employed for managing communication between determined peer group members according to one embodiment.

FIG. 5 shows a block diagram of an exemplary system 50 in which user profiles are employed for managing communication between determined peer group members according to one embodiment. Exemplary system 50 comprises clients 11A-11B and communication manager 14 communicatively coupled to communication network 13, as described above with FIG. 1. In this example, user profile data 52 is stored to a computer-readable medium, which is communicatively accessible by communication manager 14. For instance, as shown, profile information 501 is stored for client 11A and profile information 502 is stored for client 11B.

The profile information may comprise a variety of information regarding the communication preferences of a corresponding user (e.g., whether or under what conditions to connect with other peer group members in a virtual space, what information to exchange with other members in a peer group, etc.) and/or regarding information corresponding to the user, such as the user's personal information, etc. For example, in certain embodiments, the profile may specify what information (e.g., identification information, personal information, etc.) is to be communicated to other users in a given virtual space. Various rules may be defined in the profiles 52, and communication manager 14 may follow the user-specified rules in determining whether to autonomously connect a given user to other members of a determined peer group and/or in determining what information to communicate from the user to other members of the determined peer group. For instance, in certain embodiments, identification information (e.g., a name, "handle", or other information that identifies a given user) may be communicated to other members of a peer group with whom the given user is connected, whereby the identification information may be presented on a user interface to the other members In some instances, personal information about a user may be set in the user's profile to be exchanged with other users. Such personal information may include a variety of information such as information identifying how to contact the user (i.e., the user's contact information, such as email address, telephone number(s), etc.), the user's employer and/or occupation, the user's personal calendar of appointments (such that other users can determine the user's availability at various times), the user's interests/hobbies, the user's relationship status (e.g., single and looking for a mate, married, etc.), the user's educational alumni, the user's personal images (e.g., photographs), et cetera. Such personal information may be communicated to other users with whom the user is connected, and the information may be displayable on a user interface to the other users, similar to the "presence" interface 402 of FIG. 4. By selectively choosing to share some or all of this personal information with other users in a given virtual space, the user may be able to identify other users in the virtual space who share a common interest beyond their mere presence in the virtual space and/or otherwise enhance the communication exchange with other users in the shared virtual space.

The profile information may be setup directly with communication manager 14 in certain embodiments (e.g., by a user interacting with a user interface provided by the communication manager 14 to input the information), while in other embodiments all or a portion of the profile information may be inherited by the communication manager 14 from another source. For example, as shown in FIG. 5, a web server 51 may host a website with which a user may establish a user profile 52 for a given website that specifies the user's preferences, personal information, etc. The web server 51 may share the profile information 52 with communication manager 14 (e.g., by enabling communication manager 14 access to the web server's user profile information 52). The website may be defined as a virtual space, and the communication manager 14 may utilize the user's preferences defined in the profile 52 for that website hosted by web server 51 in managing the communication connection and information communicated to other users when the user is accessing this defined virtual space.

In this manner, the user may define different profiles for different virtual spaces (e.g., different websites), and the communication manager 14 inherits those profiles and employs them to manage the user's communication accordingly in each of the virtual spaces. For example, a user may setup a first profile for a virtual space that the user shares with friends and/or family members (e.g., www.myfamily.com) in which the user specifies to share a first set of information with users in that virtual space (e.g., sharing personal information, etc.), and the user may setup a second profile for a virtual space that the user shares with co-workers (e.g., a software development application space) in which the user specifies to share a second set of information with users in that virtual space (e.g., which does not share certain personal information).

In certain embodiments, information regarding each user's physical location may also be communicated to the communication manager 14, and such information may be further used in certain embodiments to determine peer groups. For instance, a client computing device may include information regarding its physical location (e.g., a GPS system), and the client computing device may communication such geographic location information to the communication manager (e.g., the information may be communicated periodically and/or as such information changes). As an example, users of a navigation application (that is defined as being part of a virtual space) who are within a certain geographic range of each other may be autonomously connected together in certain embodiments. In this way, a user of a navigation system who is driving along a particular route may be placed in communication (e.g., voice communication) with other users of such a navigation system who are on the particular route and/or otherwise within a particular geographic region relative to the user such that the users can readily exchange information with each other regarding traffic conditions, road closures, speed traps, etc.

Information identifying the users in a particular virtual space may be autonomously exchanged in certain embodiments, and a user interface on each client device may display information to the users that identifies all other users with whom the user is communicatively connected in a given virtual space. In certain embodiments, the users may invite other users to join a private conference (in a manner analogous to a subset of persons in one conference room breaking out into a separate conference room), whereby the users who join such a private conference are capable of communicating with each other separate/private from other users in the virtual space. Further, users may be capable of muting their voice communication, terminating the communicative connection (while remaining in the virtual space), and/or otherwise managing the communication with other users with whom the user is connected in a given virtual space, etc.

Just as their may be certain established rules of communication exchange between parties in a physical conference room (such as only one person speaking at a time, etc.), there may be similar mechanisms established for governing communication between parties in a virtual space in certain embodiments. For instance, in one embodiment, controls may be put in place (e.g., managed by the client communication modules or the communication manager) to control communication such that users request a virtual "microphone" which is passed along to them (e.g., upon a pre-set amount of silence from the current holder of the virtual microphone) so that only one person at a time is permitted to speak to other members who are connected. However, while various mechanisms may be put in place for managing the communication exchange between the parties in a given virtual space (which may require some interaction by the parties with a user interface, for instance), the individual parties are not required to manage the communication connection, such as by identifying the users in the space, scheduling some communication session with other users, initiating a connection with other users, etc. Further, in certain embodiments, no or relatively little controls may be put in place regarding the communication, but the rules/conduct of communication may instead be left up to the members of each peer group who are connected together. For instance, the voice communication may be "open" such that all parties can talk at any time to the other parties who are connected, analogous to an open discussion by persons in a common physical conference room.

Certain embodiments provide an enhanced shared experience by effectively integrating into various virtual spaces (e.g., software applications) support for various sharing actions, such as voice communication (VOIP), sharing of authored content, sharing of presence information identifying members of a peer group that are currently online, etc. According to certain embodiments, a voice communication feature is easily integrated into an application, such as a development application, through installation of a client communication module, which enables members of a peer group who are accessing a common virtual space (i.e., using the application) to easily conduct voice communication with each other. For instance, a development application, such as a video production application, may include support for a primary function, such as authoring content (e.g., a video), which is not communication-centric, and the client communication module may further include support for voice communication and/or other sharing of information between peer group members according to certain embodiments. Thus, the virtual spaces (e.g., software applications) being accessed by users need not be communication-centric applications, but may instead have a primary functionality directed to some other purpose, such as coding software applications, editing videos, editing images, accessing news or other information on a website, purchasing goods on a website, etc. And, certain embodiments may be employed to enable seemingly ubiquitous communication to be attendant with such defined virtual spaces. For instance, rather than requiring a user to use a separate softphone application, the voice communication capability appears to the user as an offering of the virtual space itself. Thus, the user of an application that has functionality that is not communication-centric (e.g., a software development application, animation-editing application, image-editing application, website, etc.) appears to provide the autonomous communication capability described further herein.

Figure 6:
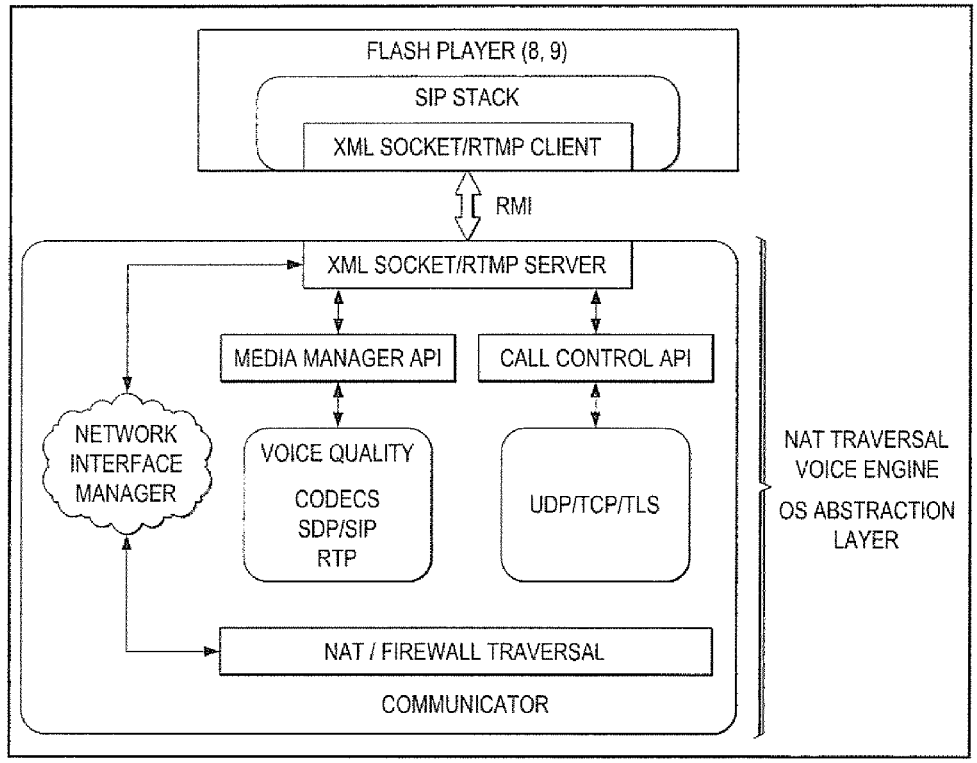
FIG. 6 shows an exemplary underlying architecture for a client communication module according to one embodiment.

As described further herein, a client communication module is loaded to each client, which is operable to interact with the communication manager 14 and establish the communication connections with the peer group members identified by the communication manager 14. Any suitable communication module may be employed on the clients, but such module is preferably sufficiently light-weight to enable wide adoption across many different platforms and devices. According to one embodiment, the client communication module comprises an architecture that provides a web browser based SIP (session initiation protocol) agent implemented on a Flash platform is provided. A client-side applet invokes Flash Communicator. The architecture further comprises a standards compliant SIP stack and media engine. The architecture also provides the above-described voice communication capability, presence capability (e.g., information about agent availability, queue length, department, account status, etc.), and instant messaging (IM) capability for text chat and web share by the agent and the caller. An exemplary architecture of such a client communication module that may be implemented in certain embodiments is shown in FIG. 6. Of course, the concepts presented herein are not limited to the client communication module architecture of FIG. 6, but may instead employ any suitable communication architecture to support the operations described herein for such module.

Figure 7A:
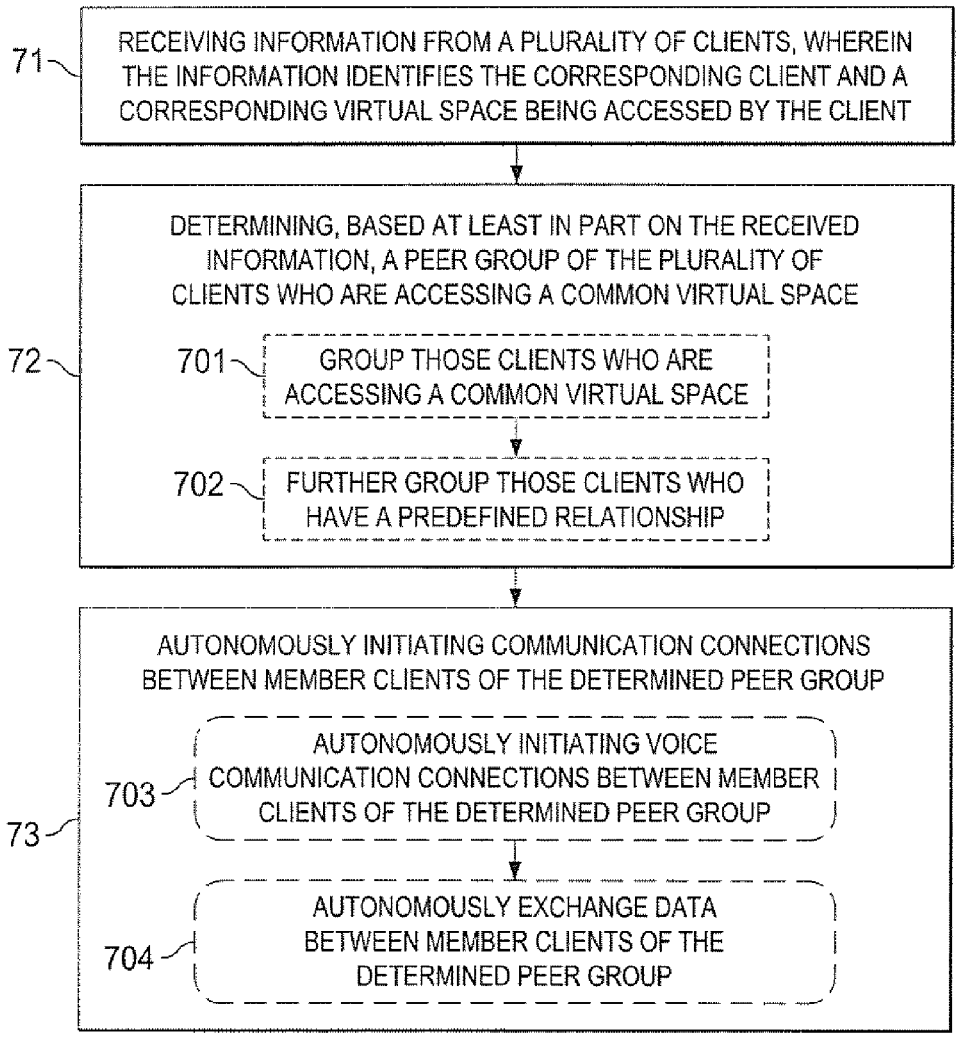
FIG. 7A shows an exemplary operational flow diagram for a communication manager according to one embodiment.

FIG. 7A shows an exemplary operational flow diagram for a communication manager 14 according to one embodiment. In operational block 71, the communication manager 14 receives information from a plurality of clients, wherein such received information identifies the corresponding client and a corresponding virtual space being accessed by the client. According to certain embodiments, this information is received from client communication modules implemented on the clients (such as client communication modules 101A-101D of FIG. 1), as described further herein. In operational block 72, the communication manager 14 determines, based at least in part on the received information, a peer group of the plurality of clients who are accessing a common virtual space. As discussed above, the determination of a peer group may be based not only on those users who are accessing a common virtual space, but in certain embodiments may also be determined based on some predefined relationship existing between the users within a virtual space. That is, while in certain embodiments all users who access a common virtual space may be grouped into a peer group, in other embodiments the communication manager may further group the users who are accessing a common virtual space into subgroups, thereby forming multiple peer groups within a given virtual space. Accordingly, in optional sub-block 701 of FIG. 7A, the communication manager groups the clients who are accessing a common virtual space, and in optional sub-block 702, the communication manager further groups those clients (who are accessing a common virtual space) into subgroups based a predefined relationship, such as based on the clients having a co-worker relationship, familial relationship, or satisfying some other relationship criteria.

In operational block 73, the communication manager 14 autonomously initiates a communication connection between member clients of the determined peer group. For instance, as shown in optional sub-block 703, in certain embodiments a voice communication connection is autonomously initiated between the members of the peer group. Further, as shown in optional sub-block 704, data (e.g., "presence" data, user identification data, and/or personal data) may be autonomously exchanged between the peer group members who are connected together.

Figure 7B:
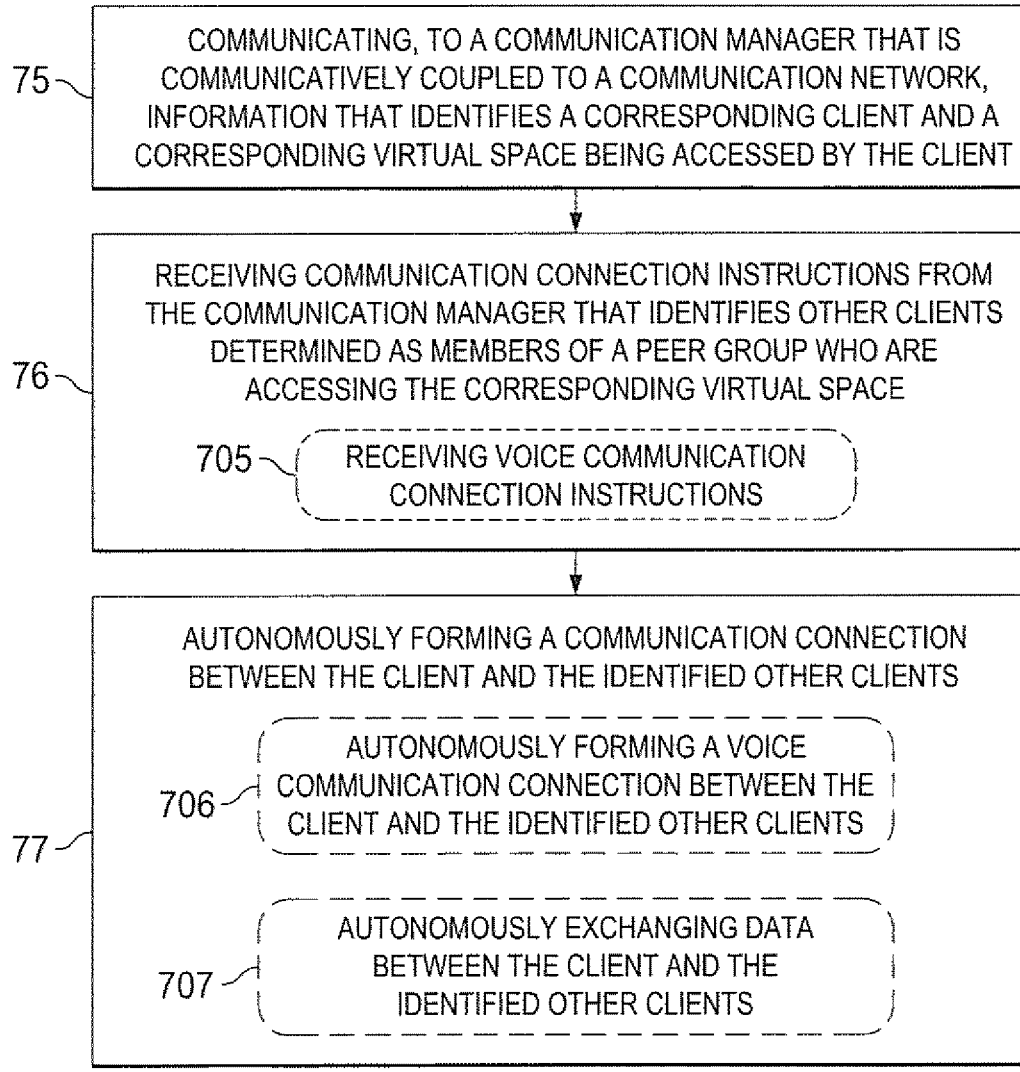
FIG. 7B shows an exemplary operational flow diagram for a client communication module according to one embodiment.

FIG. 7B shows an exemplary operational flow diagram for a client communication module according to one embodiment. In operational block 75, the client communication module communicates, to a communication manager 14 that is communicatively coupled to a communication network 13, information that identifies the corresponding client and a corresponding virtual space being accessed by the client. In operational block 76, the client communication module receives communication connection instructions from the communication manager 14 that identifies other clients determined as members of a peer group who are accessing the corresponding virtual space. As shown in optional sub-block 705, in certain embodiments instructions for forming a voice communication connection with other members of the peer group are received. Of course, as discussed further herein, instructions for forming other types of communication connections, such as videoconferencing connection, data exchange connection, etc. may be received in addition to or instead of the voice communication connection instructions.

In operational block 77, the client communication module autonomously forms a communication connection between the client and the identified other clients. As shown in optional sub-block 706, in certain embodiments a voice communication connection is formed between the members of the peer group. Further, as shown in optional sub-block 707, in certain embodiments the client communication module exchanges data (e.g., "presence" data, user identification data, and/or personal data) with the identified other clients.

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 8:
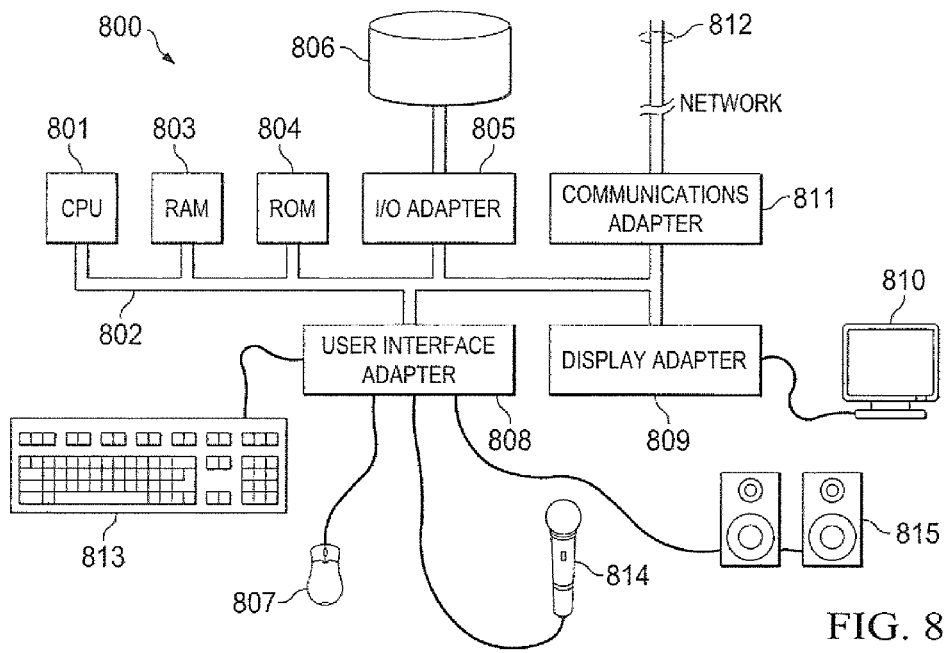
FIG. 8 shows an exemplary system on which embodiments may be implemented.

FIG. 8 illustrates an exemplary computer system 800 which may be employed to implement communication manager 14 and/or one or more of the client computing devices according to certain embodiments. Thus, peer group identifying logic 104, connection management logic 105, and/or client communication module (e.g., module 101A of FIG. 1) may be implemented on such exemplary computer system 800 according to one embodiment. Central processing unit (CPU) 801 is coupled to system bus 802. CPU 801 may be any general-purpose CPU. The present disclosure is not restricted by the architecture of CPU 801 (or other components of exemplary system 800) as long as CPU 801 (and other components of system 800) supports the inventive operations as described herein. CPU 801 may execute the various logical instructions described herein. For example, CPU 801 may execute machine-level instructions according to the exemplary operational flows described above in conjunction with FIGS. 7A and 7B.

Computer system 800 also preferably includes random access memory (RAM) 803, which may be SRAM, DRAM, SDRAM, or the like. Computer system 800 preferably includes read-only memory (ROM) 804 which may be PROM, EPROM, EEPROM, or the like. RAM 803 and ROM 804 hold user and system data and programs, as is well known in the art.

Computer system 800 also preferably includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information, such as interacting with a user interface provided by a given virtual space being accessed by the user, as described above.

I/O adapter 805 preferably connects to storage device(s) 806, such as one or more of hard drive, compact disc (CD) drive, floppy disk drive, tape drive, etc. to computer system 800. The storage devices may be utilized when RAM 803 is insufficient for the memory requirements associated with storing data for operations of peer group identifying logic 104, connection management logic 105, and/or client communication module 101A. Communications adapter 811 is preferably adapted to couple computer system 800 to network 812, which may enable information to be input to and/or output from system 800 via such network 812 (e.g., the Internet or other wide-area network, a local-area network, a public or private switched telephony network, a wireless network, any combination of the foregoing). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810 to, for example, display a user interface of a given virtual space being accessed by the user and/or other information desired to be displayed, as discussed herein.

It shall be appreciated that the present disclosure is not limited to the architecture of system 800. For example, any suitable processor-based device may be utilized for implementing communication manager 14 and/or client computing devices, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

Although embodiments and advantages have been described in detail, it should be understood that various changes, substitutions and alterations can be made herein without departing from the spirit and scope of the concepts defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized within the scope of the present application. Accordingly, the appended claims are intended to include within their scope such processes, machines, manufacture, compositions of matter, means, methods, or steps.

What is claimed is:

1. A method comprising:
  identifying, by a communication manager executed by a processor of a server that is communicatively coupled to a communication network, that a plurality of clients are communicatively coupled to the communication network and are accessing a document via a common virtual space, wherein the common virtual space is configured to communicate with both at least one first application and at least one second application having different functionality than the at least one first application, wherein identifying the plurality of clients accessing the common virtual space comprises:
    identifying at least one first edit to the document by the at least one first application executed by at least one first client of the plurality of clients;
    identifying at least one second edit to the document by the at least one second application executed by at least one second client of the plurality of clients; and
  autonomously initiating, by the communication manager, voice communication between the plurality of clients in response to identifying that the plurality of clients are accessing the document via the common virtual space and identifying the at least one first edit and the at least one second edit to the document,
  wherein the common virtual space has a primary functionality that is not voice-communication centric.

2. The method of claim 1 wherein said autonomously initiating comprises:
  autonomously initiating voice-over-IP (VOIP) communication between the plurality of clients.

3. The method of claim 1, wherein identifying the plurality of clients accessing the common virtual space further comprises identifying, for each of the plurality of clients, a respective command received from the client to execute a respective action in a collaborative application environment providing the common virtual space, wherein the respective command is different from initiating voice communication between the plurality of clients.

4. The method of claim 3, wherein, for each of the plurality of clients, autonomously initiating the voice communication is performed in response to the client accessing the common virtual space and subsequent to the common virtual space being provided by the collaborative application environment.

5. The method of claim 1, wherein autonomously initiating the voice communication further comprises initiating the voice communication between a first client executed at a first type of computing device and a second client executed at a second type of computing device different from the first type of computing device.

6. The method of claim 1, wherein autonomously initiating the voice communication comprises establishing a voice communication channel between a first client and each other client of the plurality of clients.

7. The method of claim 1, wherein autonomously initiating the voice communication is performed based on a geographic proximity of the clients.

8. The method of claim 1,
further comprising identifying, by the communication manager, at least one characteristic other than accessing the common virtual space that is common to each of the plurality of clients;
wherein autonomously initiating the voice communication between the plurality of clients is based on both the plurality of clients accessing the common virtual space and the at least one characteristic being common to each of the plurality of clients.

9. The method of claim 8, wherein identifying the at least one characteristic comprises:
identifying, for each of the plurality of clients, a respective profile associated with the client; and
determining that each of the profiles is assigned to a common task involving at least one action in the common virtual space.

10. A system comprising:
a non-transitory computer-readable medium configured to store instructions;
a processor configured to execute the instructions stored in the non-transitory computer-readable medium to perform operations comprising:
identifying that a plurality of clients are communicatively coupled to communication network and are accessing a document via a common virtual space, wherein the common virtual space has a primary functionality that is not voice-communication centric and is configured to communicate with both at least one first application and at least one second application having different functionality than the at least one first application, wherein identifying the plurality of clients accessing the common virtual space comprises:
identifying at least one first edit to the document by the at least one first application executed by at least one first client of the plurality of clients;
identifying at least one second edit to the document by the at least one second application executed by at least one second client of the plurality of clients; and
autonomously initiating voice communication between the plurality of clients in response to identifying that the plurality of clients are accessing the document via the common virtual space and identifying the at least one first edit and the at least one second edit to the document.

11. The system of claim 10, wherein the processor is further configured to execute the instructions to perform additional operations comprising receiving, from communication modules of the plurality of clients, information identifying the common virtual space.

12. The system of claim 10, wherein the processor is further configured to execute the instructions to perform additional operations comprising:
identifying at least one characteristic other than accessing the common virtual space that is common to each of a subset of clients of the plurality of clients;
grouping the subset of clients who are accessing the common virtual space into a peer group based on the at least one characteristic; and
initiating an additional voice communication for only the subset of clients based on the subset of clients both accessing the common virtual space and being grouped in the peer group.

13. A method comprising:
receiving, by a communication manager executed by a processor of a server that is communicatively coupled to a communication network, respective information from each of a plurality of clients that are communicatively coupled to the communication network, wherein the respective information identifies the corresponding client;
determining, by the communication manager, based at least in part on the received information, that a peer group of the plurality of clients are accessing a document via a common virtual space, wherein the common virtual space has a primary functionality that is not voice-communication centric and is configured to communicate with both at least one first application and at least one second application having different functionality than the at least one first application, wherein identifying the peer group accessing the common virtual space comprises:
identifying at least one first edit to the document by the at least one first application executed by at least one first member client of the peer group;
identifying at least one second edit to the document by the at least one second application executed by at least one second member client of the peer group; and
autonomously initiating, by the communication manager, voice communication between member clients of the determined peer group in response to identifying that the member clients of the determined peer group are accessing the document via the common virtual space and identifying the at least one first edit and the at least one second edit to the document.

14. A method comprising:
communicating, by a communication module of a client to a manager that is executed by a processor communicatively coupled to a communication network, information that identifies the client corresponding to the communication module and an edit by at least one client application executed at the client to a document being accessed by the client via a common virtual space wherein the common virtual space has a primary functionality that is not voice-communication centric and is configured to communicate with both the at least one client application and at least one additional application having different functionality than the at least one client application;
receiving, by the communication module, voice communication connection instructions from a communication manager identifying other clients determined as member clients of a peer group that are accessing the corresponding virtual space, wherein identifying the member clients of the peer group that are accessing the common virtual space comprises:
identifying the edit to the document by the at least one client application executed at the client;
identifying at least one additional edit to the document by the at least one additional application executed by at least one additional member client of the peer group; and
responsive to the voice communication connection instructions, autonomously establishing, by the communication module, a voice communication connection between the client and the identified other clients based on the communication manager identifying that the member clients of the peer group are accessing the document via the common virtual space and identifying the edit and the at least one additional edit to the document.

15. The method of claim 14 wherein the common virtual space comprises at least one software application.

16. The method of claim 15 wherein the at least one software application comprises at least one of:
a client-local application and a network-accessed application.

17. Computer-executable software code stored to a non-transitory computer-readable medium, which when executed by a computer causes the computer to perform a method comprising:
identifying that a plurality of clients are communicatively coupled to communication network and are accessing a document via a common virtual space, wherein the common virtual space has a primary functionality that is not voice-communication centric and is configured to communicate with both at least one first application and at least one second application having different functionality than the at least one first application, wherein identifying the plurality of clients accessing the common virtual space comprises:
identifying at least one first edit to the document by the at least one first application executed by at least one first client of the plurality of clients;
identifying at least one second edit to the document by the at least one second application executed by at least one second client of the plurality of clients; and
autonomously initiating voice communication between the plurality of clients in response to identifying that the plurality of clients are accessing the document via the common virtual space and identifying the at least one first edit and the at least one second edit to the document.

18. The computer-executable software code of claim 17 wherein the common virtual space comprises at least one software application.

19. The computer-executable software code of claim 18 wherein the at least one software application comprises at least one of:
a client-local application and a network-accessed application.

* * * * *